US012369196B2

United States Patent
Sun et al.

(10) Patent No.: US 12,369,196 B2
(45) Date of Patent: Jul. 22, 2025

(54) NR-UNLICENSED TRANSMISSION OPPORTUNITY STRUCTURE WITH FLEXIBLE STARTING POINT

(71) Applicant: QUALCOMM Incorporated, San Diego, CA (US)

(72) Inventors: Jing Sun, San Diego, CA (US); Xiaoxia Zhang, San Diego, CA (US); Taesang Yoo, San Diego, CA (US); Tamer Kadous, San Diego, CA (US); Yongbin Wei, La Jolla, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 17/658,524

(22) Filed: Apr. 8, 2022

(65) Prior Publication Data

US 2022/0264640 A1 Aug. 18, 2022

Related U.S. Application Data

(63) Continuation of application No. 16/183,367, filed on Nov. 7, 2018, now Pat. No. 11,324,047.
(Continued)

(51) Int. Cl.
*H04W 74/0808* (2024.01)
*H04L 1/00* (2006.01)
(Continued)

(52) U.S. Cl.
CPC ....... *H04W 74/0825* (2013.01); *H04L 1/0068* (2013.01); *H04L 5/0032* (2013.01);
(Continued)

(58) Field of Classification Search
CPC .......................... H04W 72/23; H04W 74/0808
See application file for complete search history.

(56) References Cited

U.S. PATENT DOCUMENTS

| 9,743,432 B2 | 8/2017 | Ji et al. |
| 10,299,257 B2 | 5/2019 | Luo et al. |

(Continued)

FOREIGN PATENT DOCUMENTS

| WO | WO-2015038908 A1 | 3/2015 |
| WO | WO-2015042594 | 3/2015 |
| WO | WO-2016105129 A1 | 6/2016 |

OTHER PUBLICATIONS

Qualcomm Incorporated, "Design Details of start and end partial subframes for UL LAA", 3GPP TSG RAN WG1 #89, May 15-19, 2017, Hangzhou, China, R1-1708785 (Year: 2017).*
(Continued)

*Primary Examiner* — Joseph A Bednash
(74) *Attorney, Agent, or Firm* — Norton Rose Fulbright LLP

(57) ABSTRACT

New radio (NR) transmission opportunity (TxOP) structure having flexible starting points are disclosed for wireless communications. When a typical listen before talk (LBT) procedure is performed, the transmitting node will not know ahead of time when the LBT will pass and, thus, when data transmissions can start. NR systems may include a mini-slot design for accommodating transmission units smaller than a slot. Aspects of the present disclosure provide for flexibly increasing the number of potential starting transmission boundaries depending on when the LBT pass is detected. Alternative aspects of the present disclosure determine the potential starting transmission points using a mini-slot based design, a floating slot based design, or a punctured slot based design with a code block group (CBG) level retransmission mechanism.

6 Claims, 23 Drawing Sheets

Related U.S. Application Data

(60) Provisional application No. 62/584,408, filed on Nov. 10, 2017.

(51) Int. Cl.
  *H04L 1/1867* (2023.01)
  *H04L 5/00* (2006.01)
  *H04L 5/14* (2006.01)
  *H04W 16/14* (2009.01)
  *H04W 72/23* (2023.01)

(52) U.S. Cl.
  CPC .......... *H04L 5/0048* (2013.01); *H04L 5/0082* (2013.01); *H04L 5/0091* (2013.01); *H04W 16/14* (2013.01); *H04W 72/23* (2023.01); *H04L 1/1896* (2013.01); *H04L 5/001* (2013.01); *H04L 5/0023* (2013.01); *H04L 5/14* (2013.01); *H04W 74/0808* (2013.01)

(56) References Cited

U.S. PATENT DOCUMENTS

| | | |
|---|---|---|
| 2016/0262188 A1 | 9/2016 | Zhang et al. |
| 2016/0301556 A1* | 10/2016 | Nory .................. H04L 27/2662 |
| 2017/0026297 A1 | 1/2017 | Sun et al. |
| 2017/0134960 A1 | 5/2017 | Zhang |
| 2017/0325216 A1* | 11/2017 | Nogami ................ H04L 5/0055 |
| 2018/0019836 A1 | 1/2018 | Kim et al. |
| 2018/0352537 A1 | 12/2018 | Zhang et al. |
| 2019/0150198 A1 | 5/2019 | Sun et al. |

OTHER PUBLICATIONS

3GPP TS 36.211: "3rd Generation Partnership Project Technical Specification Group Radio Access Network, Evolved Universal Terrestrial Radio Access (E-UTRA), Physical Channels and Modulation (Release 12)", 3rd Generation Partnership Project (3GPP), Mobile Competence Centre, 650, Route Des Lucioles, F-06921 Sophia-Antipolis Cedex, France, vol. RAN WG1, No. V12.5.0, Mar. 16, 2015 (Mar. 16, 2015), pp. 1-136, XP050928082, [retrieved on Mar. 16, 2015] p. 11-p. 14.
Ericsson., "On Pre-empted Transmissions for Downlink", 3GPP Draft, 3GPP TSG RAN WG1 Meeting #89, R1-1709111, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017 May 14, 2017 (May 14, 2017), pp. 1-3, XP051274269, Retrieved from the Internet: URL:http://www.3gpp.org/ftp/Meetings_3GPP_SYNC/RAN1/Docs/ [retrieved on May 14, 2017].
Ericsson., "On Support of Multiple DL Data Transmission Starting Points", 3GPP Draft, 3GPP TSG RAN WG1 Meeting #83, R1-157266, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 16, 2015-Nov. 20, 2015 Nov. 15, 2015 (Nov. 15, 2015), 8 pages, XP051040066, Retrieved from the Internet: URL:http://www.3gpp.org/ftp/Meetings_3GPP_SYNC/RAN1/Docs/ [retrieved on Nov. 15, 2015].
Huawei et al., "NR Frame Structure on Unlicensed Bands", 3GPP TSG RAN WG1 Meeting #90bis, R1-1717913, Prague, Czech Republic, Oct. 9-13, 2017, 8 Pages.
Huawei et al., "Remaining Issues on Reserved Resources", 3GPP TSG RAN WG1 Meeting #90bis, R1-1717079, Prague, Czech Republic, Oct. 9-13, 2017, 4 Pages.
Huawei., et al., "Support for multiple starting positions in a subframe for DL on SCell with frame structure 3", 3GPP Draft, R1-1717113, 3rd Generation Partnership Project (3GPP), Mobile Competence Centre, 650, Route Des Lucioles, F-06921 Sophia-Antipolis Cedex, France, vol. RAN WG 1, No. Prague, Czech Republic, Oct. 9, 2017-Oct. 13, 2017 Oct. 8, 2017 (Oct. 8, 2017), 3 pages, XP051340303, Retrieved from the Internet: URL:http://www.3gpp.org/ftp/Meetings_3GPPSYNC/RAN1/Docs/[retrieved on Oct. 8, 2017].
International Preliminary Report on Patentability—PCT/US2018/059797, The International Bureau of WIPO—Geneva, Switzerland, May 22, 2020.
International Search Report and Written Opinion—PCT/US2018/059797—ISA/EPO—Feb. 21, 2019.
Nokia et al., "Punctured Scheduling for Low Latency Downlink Transmissions", 3GPP TSG-RAN WG1 NR AH, R1-1701023, Spokane, WA, USA, Jan. 16-20, 2017, 5 Pages.
Qualcomm Incorporated., "TxOP Frame Structure for NR unlicensed", 3GPP Draft, R1-1813410 7.2.2.2 Frame Structure for NR-U Operation, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018 Nov. 3, 2018 (Nov. 3, 2018), pp. 1-13, XP051479732, Retrieved from the Internet: URL:http://www.3gpp.org/ftp/tsg%5Fran/WG1%5FRL1/TSGR1%5F95/Docs/R1%2D1813410%2Ezip[retrieved on Nov. 3, 2018].

* cited by examiner

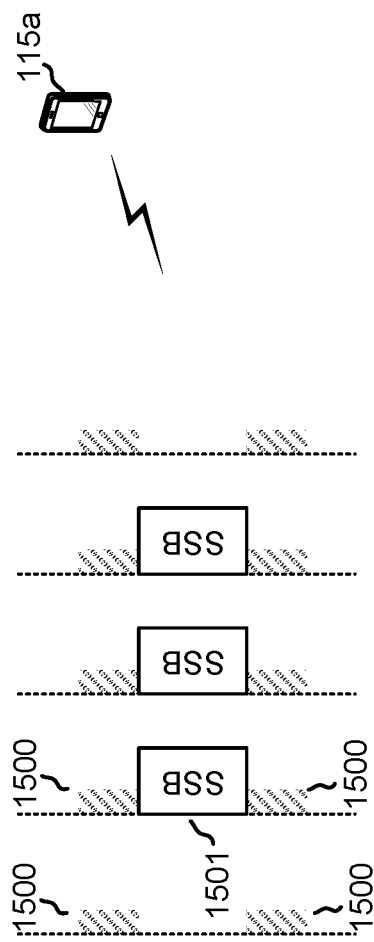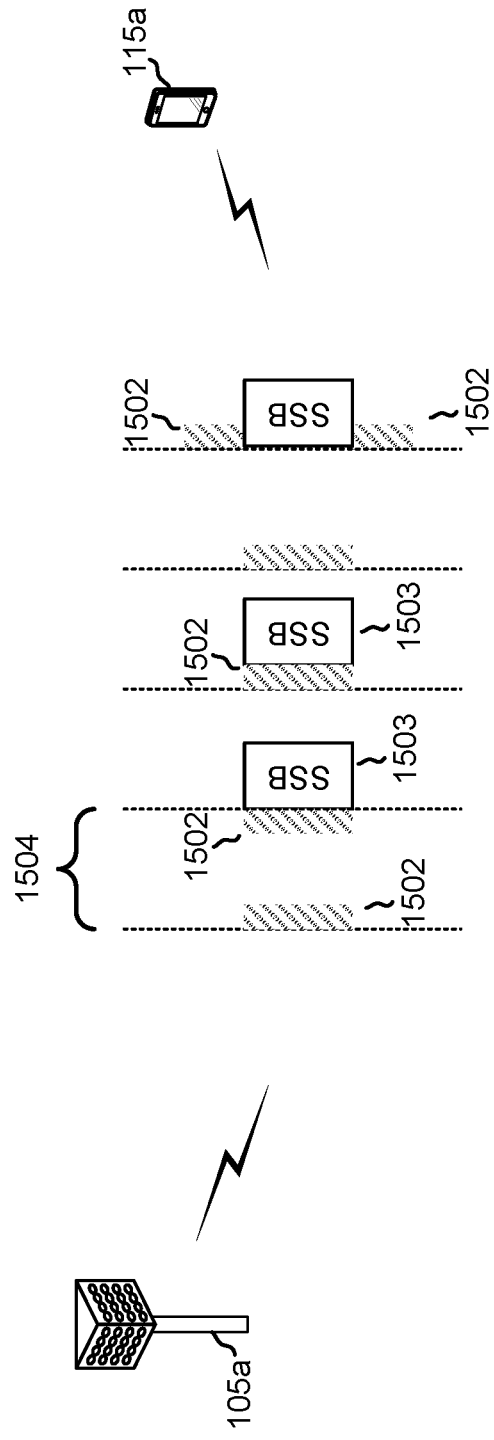

NR-UNLICENSED TRANSMISSION OPPORTUNITY STRUCTURE WITH FLEXIBLE STARTING POINT

CROSS-REFERENCE TO RELATED APPLICATIONS

This application is a continuation of and claims the benefit of U.S. patent application Ser. No. 16/183,367, entitle, "NR-UNLICENSED TRANSMISSION OPPORTUNITY STRUCTURE WITH FLEXIBLE STARTING POINT," filed on Nov. 7, 2018, and also the claims the benefit of U.S. Provisional Patent Application No. 62/584,408, entitled, "NR-UNLICENSED TRANSMISSION OPPORTUNITY STRUCTURE WITH FLEXIBLE STARTING POINT," filed on Nov. 10, 2017, both of which are expressly incorporated by reference herein in their entirety.

BACKGROUND

Field

Aspects of the present disclosure relate generally to wireless communication systems, and more particularly, new radio (NR) transmission opportunity (TxOP) structure having a flexible starting point.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes performing, by a base station, a listen before talk (LBT) procedure on a shared communication channel in response to an indication of data available for transmission, detecting, by the base station, success of the LBT procedure in a current mini-slot after a current slot boundary of a current communication slot of the shared communication channel, pre-generating, by the base station, a plurality of transmission packets of the data prior to detection of the success, wherein each of the plurality of transmission packets is associated with at least one corresponding mini-slot of the plurality of mini-slots of the current communication slot, and transmitting, by the base station, one or more of the plurality of transmission packets in the one or more next mini-slots remaining in the current communication slot.

In an additional aspect of the disclosure, a method of wireless communication includes monitoring, by a user equipment (UE), for a control resource set (CORESET) in each of a plurality of mini-slots of each communication slot of a shared communication channel, detecting, by the UE, a beginning of a transmission opportunity of the shared communication channel by a serving base station, and modifying, by the UE in response to detection of the beginning, the monitoring for the CORESET to the each communication slot of the transmission opportunity.

In an additional aspect of the disclosure, a method of wireless communication includes performing, by a base station, a LBT procedure on a shared communication channel in response to an indication of data available for transmission, detecting, by the base station, success of the LBT procedure, and transmitting, by the base station, the data in one or more transmission slots of a transmission opportunity beginning after a predetermined boundary period from detection of the success, wherein a transmission opportunity slot boundary for at least one of the one or more transmission slots is independent of a system slot boundary of the shared communication channel.

In an additional aspect of the disclosure, a method of wireless communication includes monitoring, by a UE, for a CORESET in each of a plurality of mini-slots a shared communication channel during idle transmission times, detecting, by the UE, a beginning of a transmission opportunity of the shared communication channel by a serving base station, determining, by the UE, a transmission opportunity slot timing associated with the transmission opportunity of the serving base station, and modifying the monitoring, by the UE, for the CORESET in each transmission slot of the transmissions opportunity according to the transmission opportunity slot timing.

In an additional aspect of the disclosure, a method of wireless communications includes monitoring, by a non-served UE, for broadcast transmissions between a base station and a served UE, determining, by the non-served UE, a slot boundary timing of a transmission opportunity determined using the broadcast transmission detected via the monitoring, and adjusting, by the non-served UE, scheduled communications of the non-served UE within the detected transmission opportunity of the base station and the served UE.

In an additional aspect of the disclosure, a method of wireless communications includes monitoring, by a non-served UE, for broadcast transmissions between a base station and a served UE, determining, by the non-served UE, a slot boundary timing of a transmission opportunity determined using the broadcast transmission detected via the monitoring, and adjusting, by the non-served UE, scheduled communications of the non-served UE within the detected transmission opportunity of the base station and the served UE.

In an additional aspect of the disclosure, a method of wireless communication includes detecting, by a UE, a beginning of a transmission opportunity of a shared communication channel by a serving base station, decoding, by the UE, a transmission packet received from the serving base station in a current transmission slot after the beginning, determining, by the UE, one or more code block groups (CBGs) have been identified for retransmission by the serving base station, decoding, by the UE, one or more re-transmission packets including the one or more CBGs, and assembling, by the UE, a transport block using the decoded transmission packet and the one or more CBGs decoded in the one or more re-transmission packets.

In an additional aspect of the disclosure, an apparatus configured for wireless communication includes means for performing, by a base station, a LBT procedure on a shared communication channel in response to an indication of data available for transmission, means for detecting, by the base station, success of the LBT procedure in a current mini-slot after a current slot boundary of a current communication slot of the shared communication channel, means for pre-generating, by the base station, a plurality of transmission packets of the data prior to detection of the success, wherein each of the plurality of transmission packets is associated with at least one corresponding mini-slot of the plurality of mini-slots of the current communication slot, and means for transmitting, by the base station, one or more of the plurality of transmission packets in the one or more next mini-slots remaining in the current communication slot.

In an additional aspect of the disclosure, an apparatus configured for wireless communication includes means for monitoring, by a UE, for a CORESET in each of a plurality of mini-slots of each communication slot of a shared communication channel, detecting, by the UE, a beginning of a transmission opportunity of the shared communication channel by a serving base station, and modifying, by the UE in response to detection of the beginning, the means for monitoring for the CORESET to the each communication slot of the transmission opportunity.

In an additional aspect of the disclosure, an apparatus configured for wireless communication includes means for performing, by a base station, a LBT procedure on a shared communication channel in response to an indication of data available for transmission, means for detecting, by the base station, success of the LBT procedure, and means for transmitting, by the base station, the data in one or more transmission slots of a transmission opportunity beginning after a predetermined boundary period from detection of the success, wherein a transmission opportunity slot boundary for at least one of the one or more transmission slots is independent of a system slot boundary of the shared communication channel.

In an additional aspect of the disclosure, an apparatus configured for wireless communication includes means for monitoring, by a UE, for a CORESET in each of a plurality of mini-slots a shared communication channel during idle transmission times, means for detecting, by the UE, a beginning of a transmission opportunity of the shared communication channel by a serving base station, means for determining, by the UE, a transmission opportunity slot timing associated with the transmission opportunity of the serving base station, and means for modifying the means for monitoring, by the UE, for the CORESET in each transmission slot of the transmissions opportunity according to the transmission opportunity slot timing.

In an additional aspect of the disclosure, an apparatus configured for wireless communication includes means for monitoring, by a non-served UE, for broadcast transmissions between a base station and a served UE, means for determining, by the non-served UE, a slot boundary timing of a transmission opportunity determined using the broadcast transmission detected via the means for monitoring, and means for adjusting, by the non-served UE, scheduled communications of the non-served UE within the detected transmission opportunity of the base station and the served UE.

In an additional aspect of the disclosure, an apparatus configured for wireless communication includes means for monitoring, by a non-served UE, for broadcast transmissions between a base station and a served UE, means for determining, by the non-served UE, a slot boundary timing of a transmission opportunity determined using the broadcast transmission detected via execution of the means for monitoring, and means for adjusting, by the non-served UE, scheduled communications of the non-served UE within the detected transmission opportunity of the base station and the served UE.

In an additional aspect of the disclosure, an apparatus configured for wireless communication includes means for detecting, by a UE, a beginning of a transmission opportunity of a shared communication channel by a serving base station, means for decoding, by the UE, a transmission packet received from the serving base station in a current transmission slot after the beginning, means for determining, by the UE, one or more code block groups (CBGs) have been identified for retransmission by the serving base station, means for decoding, by the UE, one or more re-transmission packets including the one or more CBGs, and means for assembling, by the UE, a transport block using the decoded transmission packet and the one or more CBGs decoded in the one or more re-transmission packets.

In an additional aspect of the disclosure, a non-transitory computer-readable medium having program code recorded thereon. The program code further includes code to perform, by a base station, a LBT procedure on a shared communication channel in response to an indication of data available for transmission, code to detect, by the base station, success of the LBT procedure in a current mini-slot after a current slot boundary of a current communication slot of the shared communication channel, code to pre-generate, by the base station, a plurality of transmission packets of the data prior to detection of the success, wherein each of the plurality of transmission packets is associated with at least one corresponding mini-slot of the plurality of mini-slots of the current communication slot, and code to transmit, by the base station, one or more of the plurality of transmission packets in the one or more next mini-slots remaining in the current communication slot.

In an additional aspect of the disclosure, a non-transitory computer-readable medium having program code recorded thereon. The program code further includes code to monitor, by a UE, for a CORESET in each of a plurality of mini-slots of each communication slot of a shared communication channel, code to detect, by the UE, a beginning of a transmission opportunity of the shared communication channel by a serving base station, and code to modify, by the UE in response to detection of the beginning, execution of the code to monitor for the CORESET to the each communication slot of the transmission opportunity.

In an additional aspect of the disclosure, a non-transitory computer-readable medium having program code recorded thereon. The program code further includes code to perform, by a base station, a LBT procedure on a shared communication channel in response to an indication of data available for transmission, code to detect, by the base station, success of the LBT procedure, and code to transmit, by the base station, the data in one or more transmission slots of a transmission opportunity beginning after a predetermined boundary period from detection of the success, wherein a transmission opportunity slot boundary for at least one of the one or more transmission slots is independent of a system slot boundary of the shared communication channel.

In an additional aspect of the disclosure, a non-transitory computer-readable medium having program code recorded thereon. The program code further includes code to monitor, by a UE, for a CORESET in each of a plurality of mini-slots a shared communication channel during idle transmission times, code to detect, by the UE, a beginning of a transmission opportunity of the shared communication channel by a serving base station, code to determine, by the UE, a transmission opportunity slot timing associated with the transmission opportunity of the serving base station, and code to modify execution of the code to monitor, by the UE, for the CORESET in each transmission slot of the transmissions opportunity according to the transmission opportunity slot timing.

In an additional aspect of the disclosure, a non-transitory computer-readable medium having program code recorded thereon. The program code further includes code to monitor, by a non-served UE, for broadcast transmissions between a base station and a served UE, code to determine, by the non-served UE, a slot boundary timing of a transmission opportunity determined using the broadcast transmission detected via execution of the code to monitor, and code to adjust, by the non-served UE, scheduled communications of the non-served UE within the detected transmission opportunity of the base station and the served UE.

In an additional aspect of the disclosure, a non-transitory computer-readable medium having program code recorded thereon. The program code further includes code to monitor, by a non-served UE, for broadcast transmissions between a base station and a served UE, code to determine, by the non-served UE, a slot boundary timing of a transmission opportunity determined using the broadcast transmission detected via execution of the code to monitor, and code to adjust, by the non-served UE, scheduled communications of the non-served UE within the detected transmission opportunity of the base station and the served UE.

In an additional aspect of the disclosure, a non-transitory computer-readable medium having program code recorded thereon. The program code further includes code to detect, by a UE, a beginning of a transmission opportunity of a shared communication channel by a serving base station, code to decode, by the UE, a transmission packet received from the serving base station in a current transmission slot after the beginning, code to determine, by the UE, one or more code block groups (CBGs) have been identified for retransmission by the serving base station, code to decode, by the UE, one or more re-transmission packets including the one or more CBGs, and code to assemble, by the UE, a transport block using the decoded transmission packet and the one or more CBGs decoded in the one or more re-transmission packets.

In an additional aspect of the disclosure, an apparatus configured for wireless communication is disclosed. The apparatus includes at least one processor, and a memory coupled to the processor. The processor is configured to perform, by a base station, a LBT procedure on a shared communication channel in response to an indication of data available for transmission, to detect, by the base station, success of the LBT procedure in a current mini-slot after a current slot boundary of a current communication slot of the shared communication channel, to pre-generate, by the base station, a plurality of transmission packets of the data prior to detection of the success, wherein each of the plurality of transmission packets is associated with at least one corresponding mini-slot of the plurality of mini-slots of the current communication slot, and to transmit, by the base station, one or more of the plurality of transmission packets in the one or more next mini-slots remaining in the current communication slot.

In an additional aspect of the disclosure, an apparatus configured for wireless communication is disclosed. The apparatus includes at least one processor, and a memory coupled to the processor. The processor is configured to monitor, by a UE, for a CORESET in each of a plurality of mini-slots of each communication slot of a shared communication channel, to detect, by the UE, a beginning of a transmission opportunity of the shared communication channel by a serving base station, and to modify, by the UE in response to detection of the beginning, execution of the configuration to monitor for the CORESET to the each communication slot of the transmission opportunity.

In an additional aspect of the disclosure, an apparatus configured for wireless communication is disclosed. The apparatus includes at least one processor, and a memory coupled to the processor. The processor is configured to perform, by a base station, a LBT procedure on a shared communication channel in response to an indication of data available for transmission, to detect, by the base station, success of the LBT procedure, and to transmit, by the base station, the data in one or more transmission slots of a transmission opportunity beginning after a predetermined boundary period from detection of the success, wherein a transmission opportunity slot boundary for at least one of the one or more transmission slots is independent of a system slot boundary of the shared communication channel.

In an additional aspect of the disclosure, an apparatus configured for wireless communication is disclosed. The apparatus includes at least one processor, and a memory coupled to the processor. The processor is configured to monitor, by a UE, for a CORESET in each of a plurality of mini-slots a shared communication channel during idle transmission times, to detect, by the UE, a beginning of a transmission opportunity of the shared communication channel by a serving base station, to determine, by the UE, a transmission opportunity slot timing associated with the transmission opportunity of the serving base station, and to modify execution of the configuration to monitor, by the UE, for the CORESET in each transmission slot of the transmissions opportunity according to the transmission opportunity slot timing.

In an additional aspect of the disclosure, an apparatus configured for wireless communication is disclosed. The apparatus includes at least one processor, and a memory coupled to the processor. The processor is configured to monitor, by a non-served UE, for broadcast transmissions between a base station and a served UE, to determine, by the non-served UE, a slot boundary timing of a transmission opportunity determined using the broadcast transmission detected via execution of the configuration to monitor, and to adjust, by the non-served UE, scheduled communications of the non-served UE within the detected transmission opportunity of the base station and the served UE.

In an additional aspect of the disclosure, an apparatus configured for wireless communication is disclosed. The apparatus includes at least one processor, and a memory coupled to the processor. The processor is configured to monitor, by a non-served UE, for broadcast transmissions between a base station and a served UE, to determine, by the non-served UE, a slot boundary timing of a transmission opportunity determined using the broadcast transmission detected via execution of the configuration to monitor, and to adjust, by the non-served UE, scheduled communications of the non-served UE within the detected transmission opportunity of the base station and the served UE.

In an additional aspect of the disclosure, an apparatus configured for wireless communication is disclosed. The apparatus includes at least one processor, and a memory coupled to the processor. The processor is configured to detect, by a UE, a beginning of a transmission opportunity of a shared communication channel by a serving base station, to decode, by the UE, a transmission packet received from the serving base station in a current transmission slot after the beginning, to determine, by the UE, one or more code block groups (CBGs) have been identified for retransmission by the serving base station, to decode, by the UE, one or more re-transmission packets including the one or more CBGs, and to assemble, by the UE, a transport block using the decoded transmission packet and the one or more CBGs decoded in the one or more re-transmission packets.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 15A and 15B are block diagrams illustrating a base station and UE configured according to aspects of the present disclosure.

DETAILED DESCRIPTION

Figure 1:
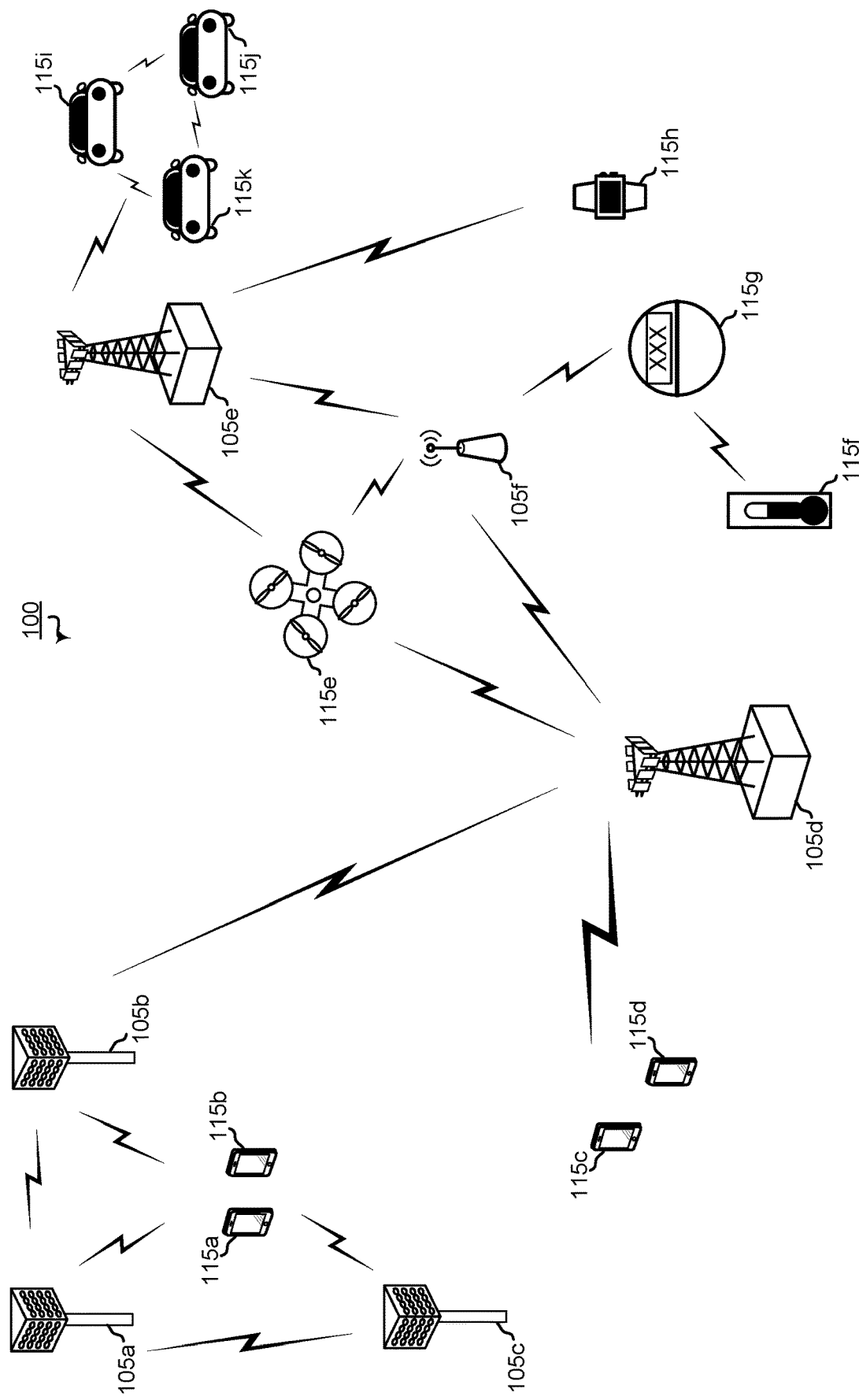
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
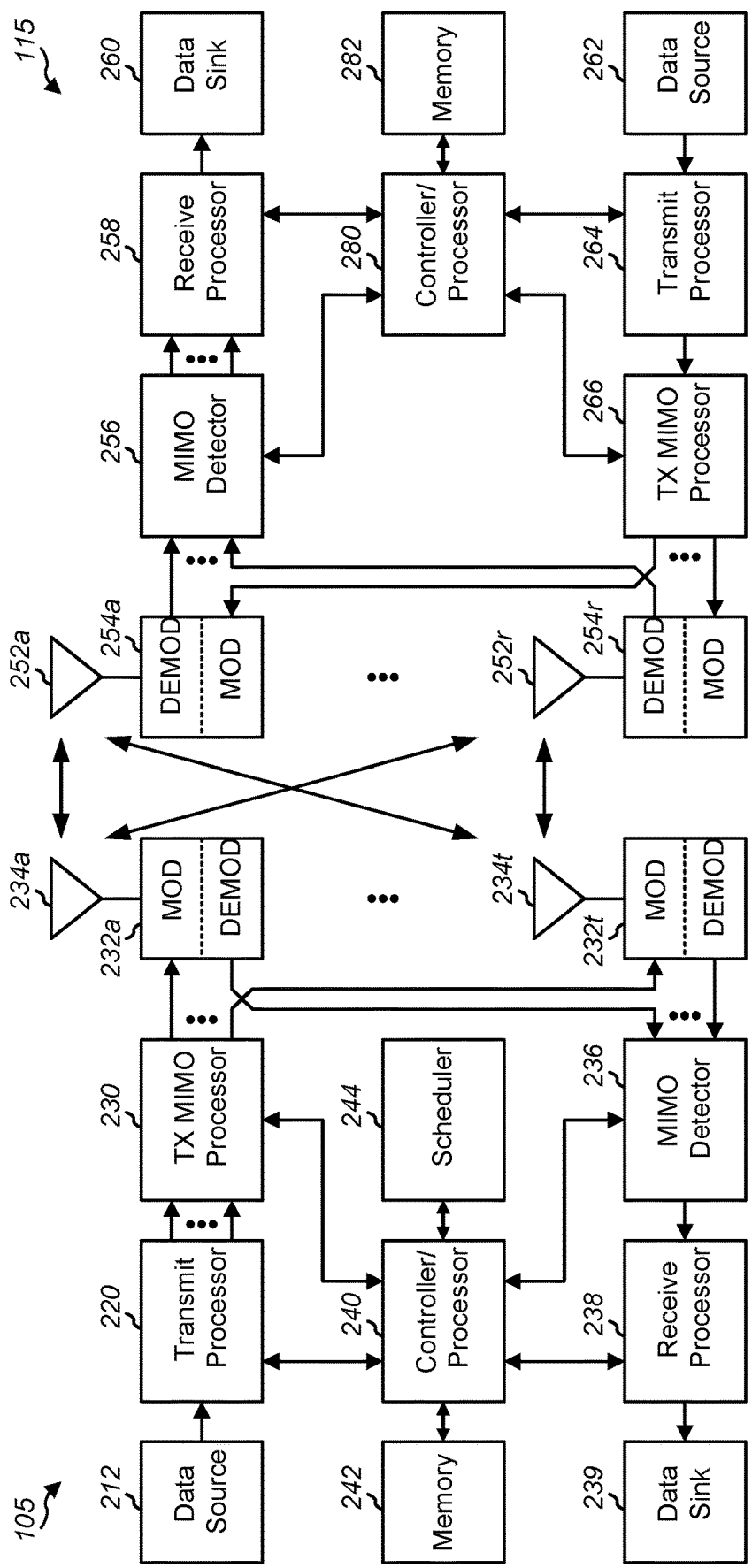
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4, 6, 8, 10, 16, 18A, and 18B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
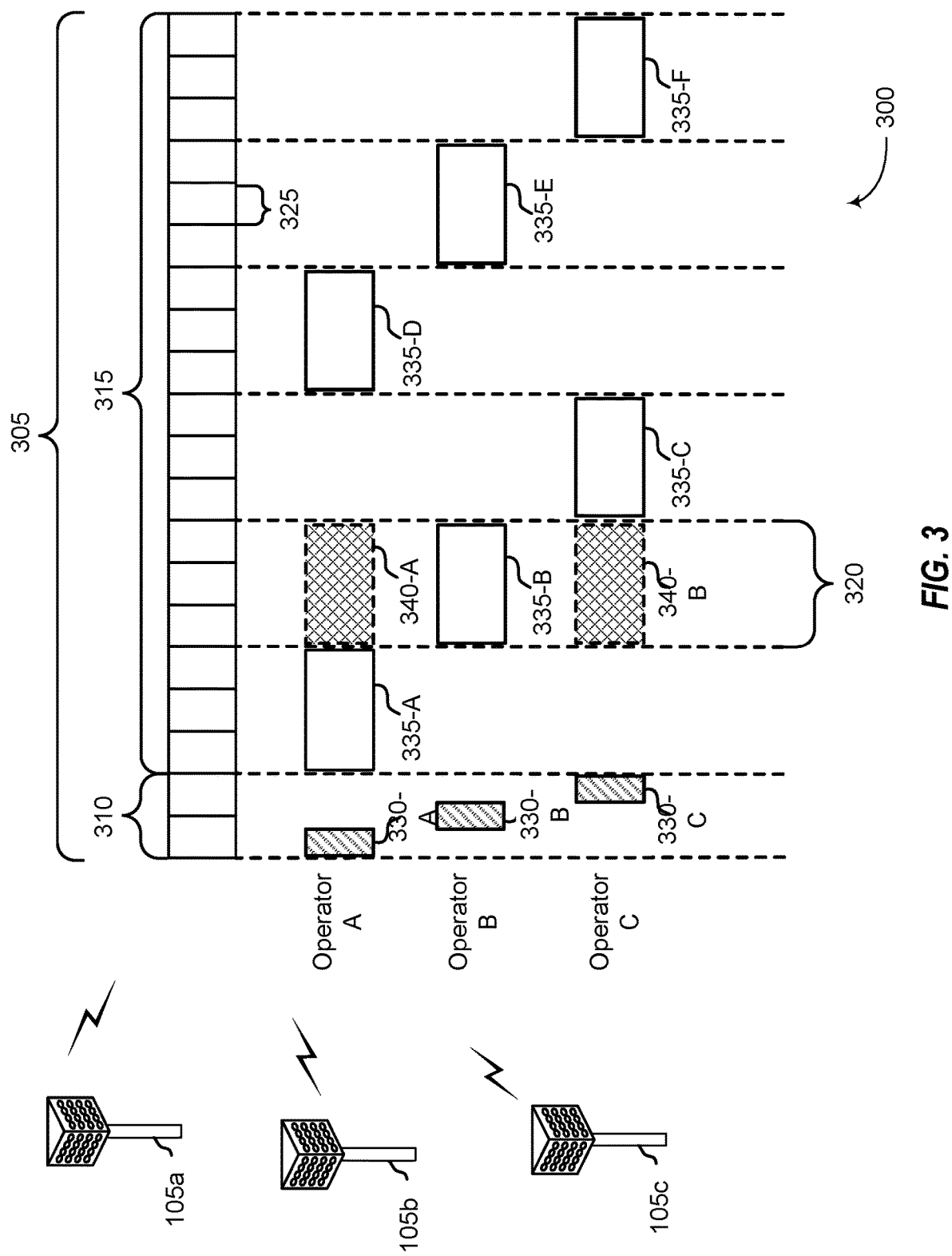
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIB s)), paging information (e.g., physical broadcast channel (PB CH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Within the 5G systems, the LBT procedure may be used to sense channel use prior to transmitting on a shared communication channel. In general, an LBT procedure provides for the transmitting node to perform a CCA check to evaluate the presence or absence of other signals on the shared channel. Such CCA checks may use at least an energy detection process to determine if interference detected on the shared channel rises to a level to be considered an actual signal using the channel. Four categories of LBT procedure have been discussed for use in 5G systems. The first category of LBT (Cat-1 LBT) provides no LBT at all. In such Cat-1 LBT circumstances, the transmitter would simply begin to transmit. The second category of LBT (Cat-2 LBT) provides for performing an LBT, such as through a CCA, only without a random back-off or contention window. Such, shortened Cat-2 LBTs result in a quick check of the channel prior to beginning transmissions. The Cat-2 LBT may also be referred to as the 25 µs LBT. The third category of LBT (Cat-3) provides for performing an LBT procedure with both a random back-off value and a fixed contention window. The fourth category of LBT (Cat-4) provides for performing an LBT procedure with both a random back-off value and a variable contention window. In both Cat-3 and Cat-4 LBT, the transmitter selects a random number for the back-off value and performs the LBT or CCA check when the random back-off has passed. However, in Cat-3 the contention window size is fixed, while it is variable in Cat-4.

When a Cat-4 LBT is used, the transmitter would not know ahead of time when the LBT will pass and, thus, when the data transmission can start. When the LBT does, in fact, pass, consideration has been given to when the transmitter may begin the data transmissions. In LTE-further enhanced license assisted access (feLAA), the start of the transmission may be aligned to the slot boundary (e.g., 0.5 ms resolution). The increase in the number of transmit starting times has been suggested, but, due to the structural limitations of LTE networks, have not been successfully adopted. One such suggestion has been to use the LTE short transmission time interval (sTTI) structure to implement more starting points. The new radio (NR) technology in 5G networks includes a mini-slot design that may be more friendly to increased start times, at least in unlicensed spectrum. Discussions have provided a prioritization for NR mini-slot lengths of 2, 4, and 7 symbols.

The various aspects of the present disclosure are directed to providing additional transmission start times for contention-based transmission over a shared communication channel. The alternative aspects described herein may provide for a mini-slot based transmission start time design, a floating slot based transmission start time design, and a punctured slot based transmission start time design that includes code block group (CBG)-level retransmission.

Figure 4:
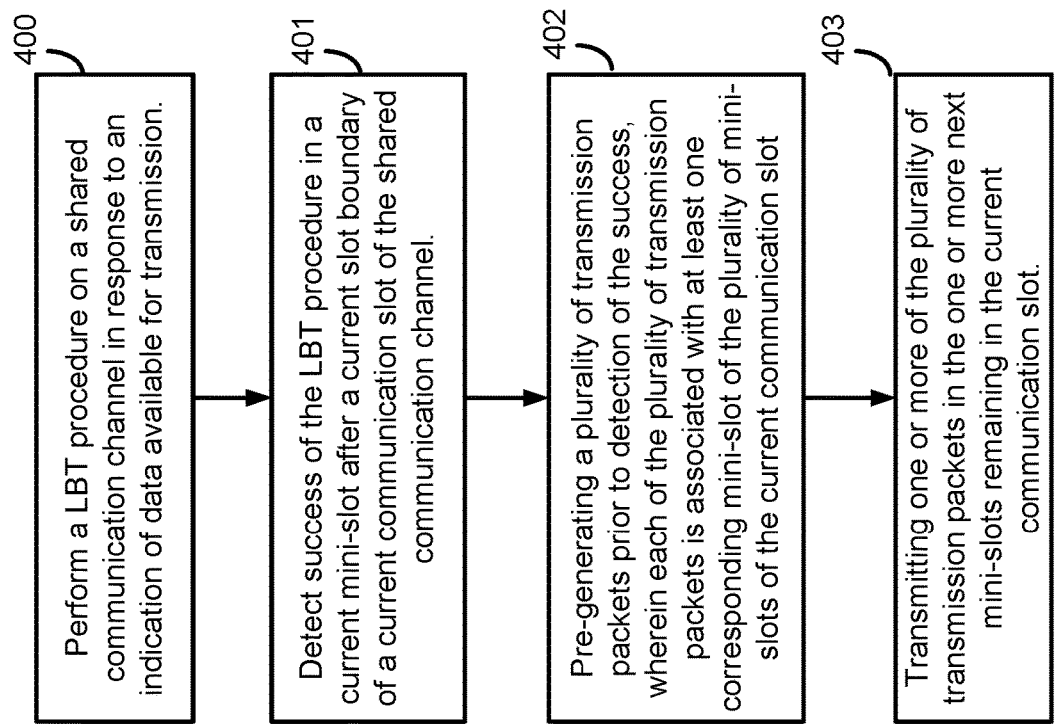
FIG. 4 is a block diagram illustrating example blocks executed to implement one aspect of the present disclosure.
Figure 22:
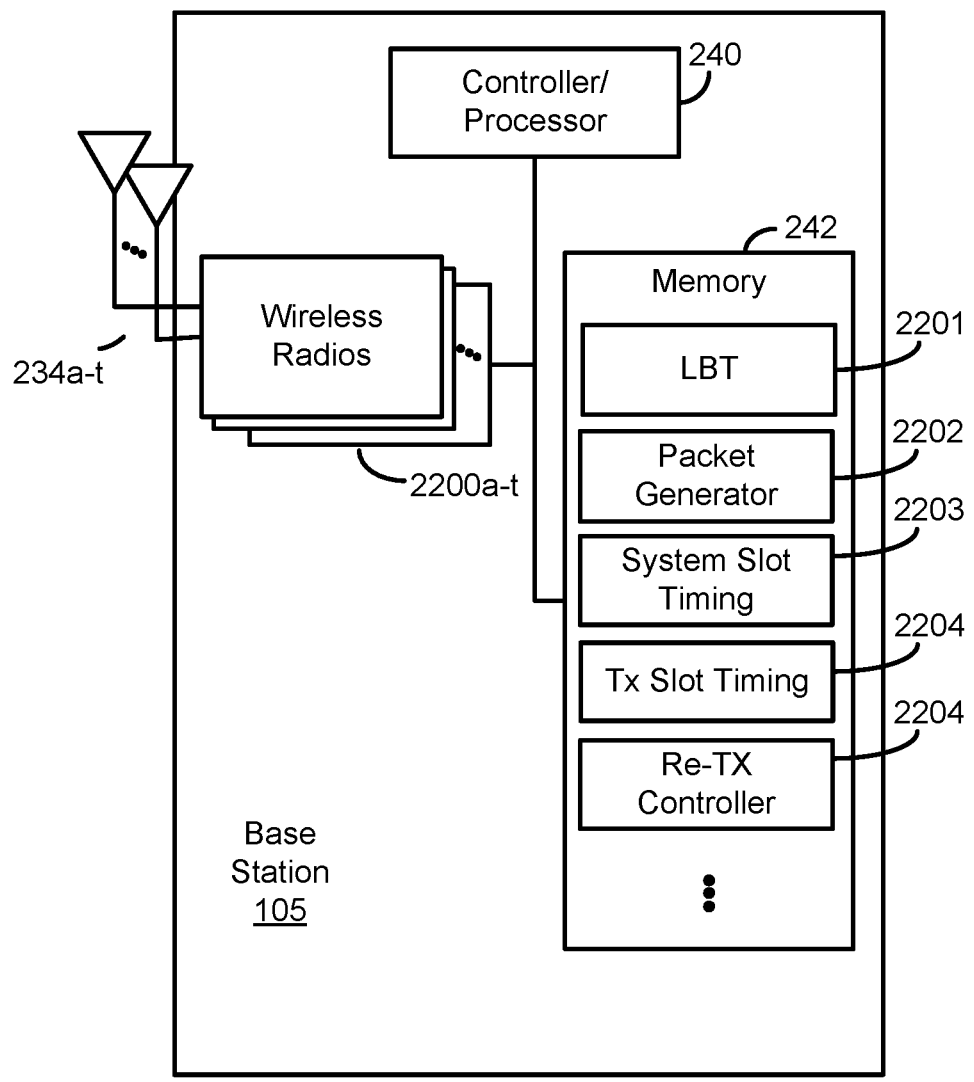
FIG. 22 is a block diagram illustrating a base station configured according to various aspects of the present disclosure.

FIG. 4 is a block diagram illustrating example blocks executed to implement one aspect of the present disclosure. The example blocks will also be described with respect to base station 105 as illustrated in FIG. 22. FIG. 22 is a block diagram illustrating base station 105 configured according to one aspect of the present disclosure. Base station 105 includes the structure, hardware, and components as illustrated for Base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 2200a-t and antennas 234a-t. Wireless radios 2200a-t includes various components and hardware, as illustrated in FIG. 2 for base station 105, including modulator/demodulators 232a-t, MIMO detector 236, receive processor 238, transmit processor 220, and TX MIMO processor 230.

At block 400, a base station performs an LBT procedure on a shared communication channel in response to an indication of data available for transmission. As a base station, such as base station 105, obtains data for transmission to one of its served UEs, the base station will be triggered for downlink communications. Base station 105, under control of controller/processor 240, executes LBT logic 2201, stored in memory 242. The execution environment of LBT logic 2201, allows for base station 105 to perform an LBT procedure, such as a clear channel assessment (CCA) check by monitoring for signal energies on the shared channel via antennas 234a-t and wireless radios 2200a-t.

At block 401, the base station detects success of the LBT procedure in a current mini-slot after a current slot boundary of a current communication slot of the shared communication channel. For example, base station 105 detects signal energy via antennas 234a-t and wireless radios 2200a-t to determine that no signals are present on the shared channel that rise to an energy level that would indicate the channel already being occupied. The transmission stream for the nodes communicating according to the example aspect of FIG. 4 is divided into transmission slots. The transmission slots are further divided into mini-slots. A transmission opportunity (TxOP) for the transmitter may incorporate multiple transmission slots between both downlink and uplink transmissions. With the mini-slot based design of the currently-described example aspect, normal transmission follows the transmission slot boundary. The mini-slots are used to fill transmissions for the TxOP when the LBT passes between transmission slot boundaries. In order to accommodate the time between detecting the successful LBT and transmission of the downlink data, a channel reservation signal or filler signal may be used to occupy the shared communication channel for any remaining time before the next mini-slot boundary.

It should be noted that use of the NR mini-slot in such a manner is similar in design to use of the sTTI design in feLAA systems.

At block 402, the base station pre-generates a plurality of transmission packets prior to detection of the success, wherein each of the plurality of transmission packets is associated with at least one corresponding mini-slot of the plurality of mini-slots of the current communication slot. The amount of time between the success of the LBT being detected and the beginning of the next mini-slot may not be sufficient to allow base station 105 to process the downlink communications (e.g., PDSCH). For example, in order to generate the PDSCH, base station 105 would form the packet, encode the packet, etc. Additionally, there may be time used to transmit channel reservation signals, but that signal may be short for less overhead. Accordingly, unlike the sTTI design in feLAA systems, aspects of the present disclosure provide for base station 105 to execute, under control of controller/processor 240, packet generator 2202, stored in memory 242, to pre-generate multiple transmission packets after initiation of the LBT, but prior to detecting its success.

Such an aspect would involve generating multiple slots/mini-slots with the same or different data. The complexity may increase when retransmissions are involved. Rate matching of the pre-generated packets may be relatively straight-forward, as the base station would know what to rate match around for each mini-slot and slot. Moreover, the data packets may be pre-rate matched, as preparing the PDSCH using prepared slot and mini-slot packets is known. The number of data packets to pre-prepare may depend on how fast the base station can generate a packet. If a longer time is needed by a base station, more mini-slots can be pre-prepared. As such, when the LBT pass is detected, there will be packets ready to transmit at the next mini-slot boundary, even where the amount of time between LBT pass and the next mini-slot boundary is very small.

At block 403, the base station transmits one or more of the plurality of transmission packets in the one or more next mini-slots remaining in the current communication slot. Of the multiple, pre-generated mini-slots worth of PDSCH, some of the transmission packets can be dropped from each mini-slot, and filled with filler signaling, when the LBT does not pass during that particular mini-slot. The execution environment of LBT logic 2201 maintains identification of the mini-slots passed during the monitoring for the success of the LBT. Base station 105, under control of controller/processor 240 would cause the corresponding packets of the passed mini-slots to be dropped from the transmission of the remaining pre-generated packets via wireless radios 2200a-t and antennas 234a-t. For example, in an example system that has four mini-slots per slot, base station 105 may prepare four or more mini-slots' worth of data packets. However, if base station 105 detects LBT pass only in the middle of the third mini-slot, it may drop the first three pre-prepared data packets, use the channel reservation or filler signals for the remainder of the third mini-slot, and then begin downlink transmissions with the fourth mini-slot using the pre-prepared packet for the fourth mini-slot.

Figure 5:
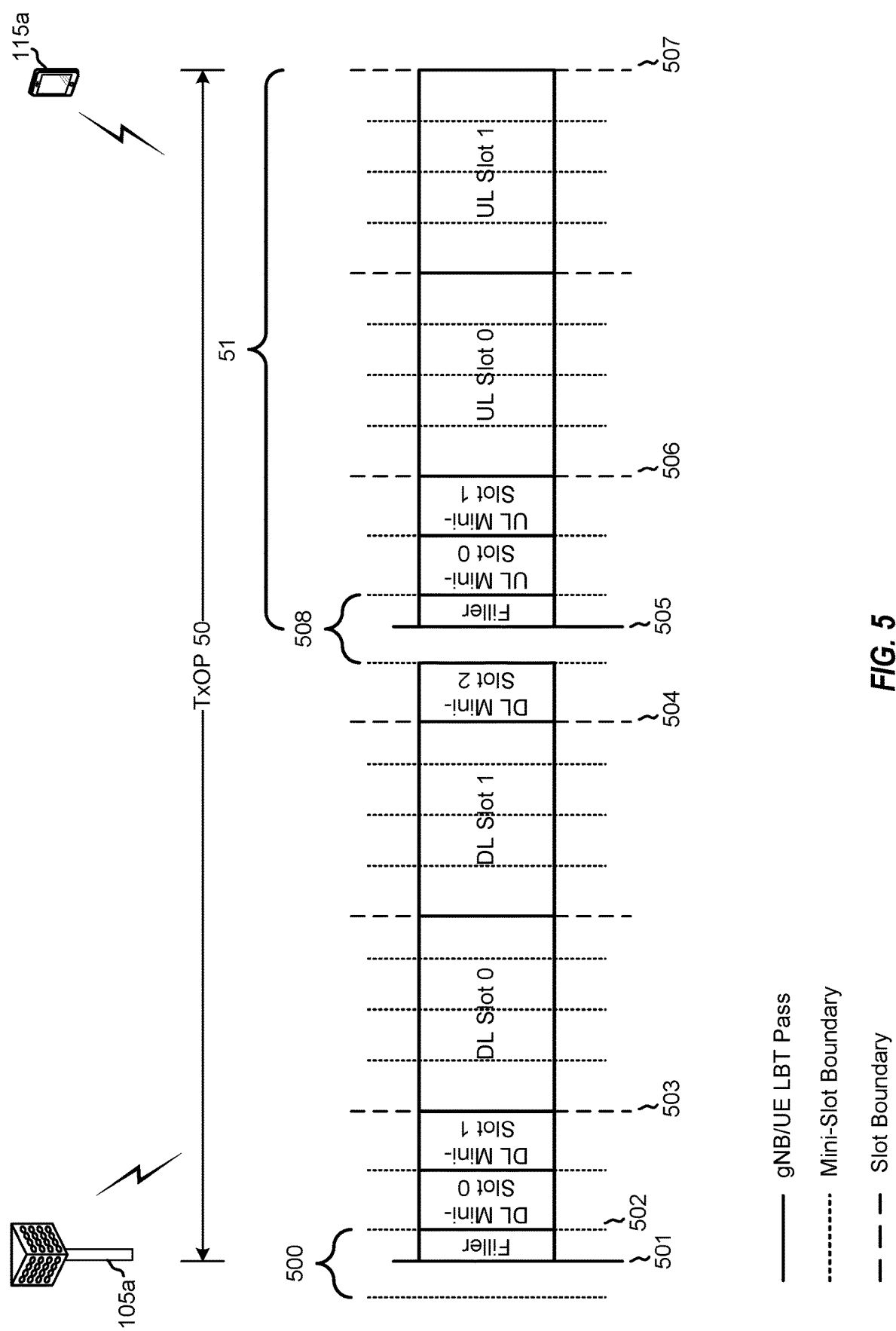
FIG. 5 is a block diagram illustrating a base station and UE configured with mini-slot based designs according to one aspect of the present disclosure.

FIG. 5 is a block diagram illustrating a base station 105a and UE 115a configured with mini-slot based designs according to one aspect of the present disclosure. Base station 105a and UE 115a are configured with a mini-slot based design for transmission starts over a share communication channel. In the middle of a mini-slot 500, base station 105a detects the successful LBT at 501. Thus, TxOP 50 begins at 501. Base station 105a responds to the LBT pass by immediately transmitting channel occupancy or filler signals until the beginning of the next mini-slot at 502. Base station 105a then transmits DL mini-slot 0 and DL mini-slot 1. At the next system slot boundary, 503, base station 105a transmits two full length slots, DL slot 0 and DL slot 1. Base station 105a finishes out its downlink transmissions for TxOP 50 using another mini-slot transmission at 504 of DL mini-slot 2.

On the uplink side, after a gap period, UE 115a performs an LBT, which is detected as successful at 505. UE 115a also needs time to process and prepare PUSCH (forming packet, encoding, etc.). It may not be capable of PUSCH preparation fast enough to wait until detecting the LBT pass. As with the downlink side, there may be channel reservation signals to transmit, but those signals may be relatively short to maintain lower overhead. Compared with the PDSCH preparation process, UE 115a cannot pre-prepare multiple copies of PUSCH because the content of PUSCH is generally controlled by base station 105 (e.g., transport block size (TBS), hybrid automatic repeat request (HARQ) processes, redundancy version identifier (RVID), new data indicator (NDI), etc). Currently, in LTE, the LAA and MuLTEfire (MF) designs use a puncture-based (feLAA mode 1 uplink) for such PUSCH preparation. In such a design, the UE would prepare the PUSCH for the full subframe transmission, but puncture the first slot if the LBT does not pass before the first slot, slot 0. A known issue with this approach is that the punctured PUSCH may have a low chance of being decoded. Moreover, in NR systems, due to frequency first mapping procedure, the chances of successfully decoding such a punctured PUSCH may be even lower.

The aspects of the present disclosure illustrated in FIG. 5 provide for base station 105a to grant a sequence of mini-slots/slots at the beginning of the uplink burst. For example, when base station 105a sends the uplink grant for uplink burst 51, it grants the sequence of mini-slot 508, UL mini-slots 0 and 1, and UL slots 0 and 1. When the uplink LBT pass is detected at 505, UE 115a drops any packets for mini-slot 508, transmits PUSCH in UL mini-slots 0 and 1 before the next system slot boundary 506, and transmits PUSCH in UL slots 0 and 1, until the end of the TxOP at 507.

Figure 6:
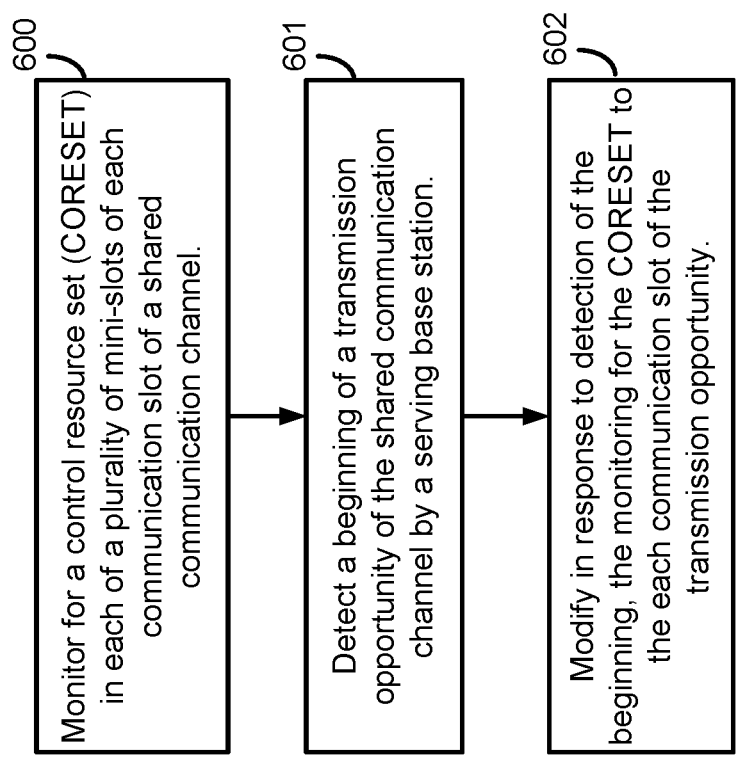
FIG. 6 is a block diagram illustrating example blocks executed to implement one aspect of the present disclosure.
Figure 23:
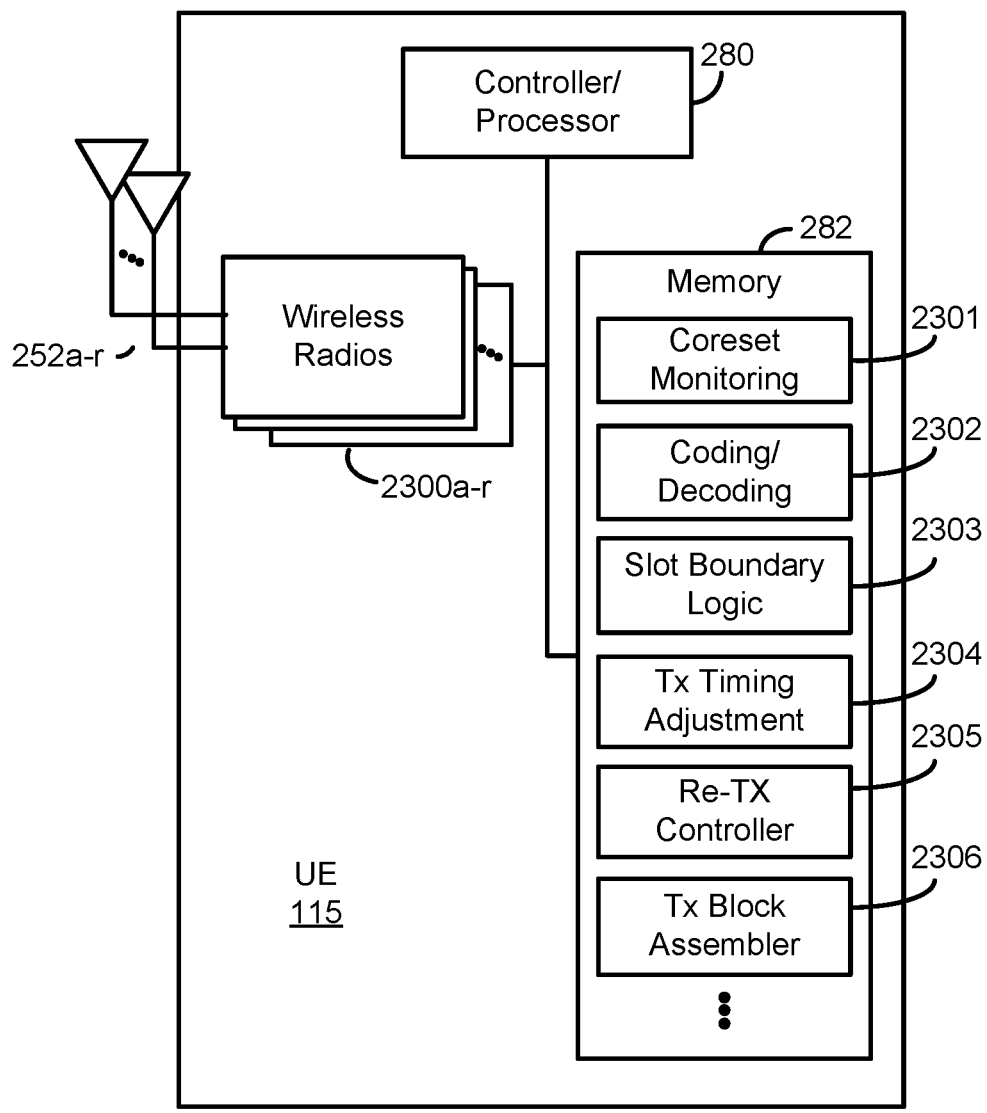
FIG. 23 is a block diagram illustrating a UE configured according to various aspects of the present disclosure.

FIG. 6 is a block diagram illustrating example blocks executed to implement one aspect of the present disclosure. The example blocks will also be described with respect to UE 115 as illustrated in FIG. 23. FIG. 23 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 2300a-r and antennas 252a-r. Wireless radios 2300a-r includes various components and hardware, as illustrated in FIG. 2 for UE 115, including modulator/demodulators 254a-r, MIMO detector 256, receive processor 258, transmit processor 264, and TX MIMO processor 266.

At block 600, a UE monitors for a control resource set (Coreset) in each of a plurality of mini-slots of each communication slot of a shared communication channel. A UE, such as UE 115, executes, under control of controller/processor 280, Coreset monitoring function 2301, stored in memory 282. The execution environment of Coreset monitoring function 2301 allows for UE 115 to identify Coreset transmissions in signals detected via antennas 252a-r and wireless radios 2300a-r. Because of the increased number of potential transmission starts resulting from the use of the mini-slot based design, there is potential that a Coreset may be transmitted by the base station at each mini-slot and slot. Accordingly, the described aspect of the present disclosure provides for additional, more frequency monitoring for the Coreset by UE 115.

At block 601, the UE detects a beginning of a transmission opportunity of the shared communication channel by a serving base station. As signals are detected via antennas 252a-r and wireless radios 2300a-r, UE 115 executes, under control of controller/processor 280, coding/decoding logic 2302 to decode the signals. The decoded signals may then be used accordingly. Coding/decoding logic 2302 may, thus, decode detected signals and determine such signals correspond to the initial transmission from a serving base station. UE 115 may, thus, determine the beginning of the TxOP based on the decoded signals received. Therefore, prior to beginning of a TxOP, each potential transmission starting point could conceivably include transmission of Coreset information. UE 115 monitors for beginning of such a TxOP.

At block 602, the UE modifies, in response to detection of the beginning, the monitoring for the Coreset to the each communication slot of the transmission opportunity. When the TxOP begins, Coreset information could be transmitted at each transmission unit (e.g., each mini-slot or slot). Thus, monitoring each mini-slot and slot after the beginning of a TxOP would be unnecessary. As such, when UE 115 detects the beginning of the TxOP in block 505, it may then modify Coreset monitoring function 2301 to modify the monitoring to each communication slot (e.g., mini-slot or slot) of the TxOP.

Figure 7:
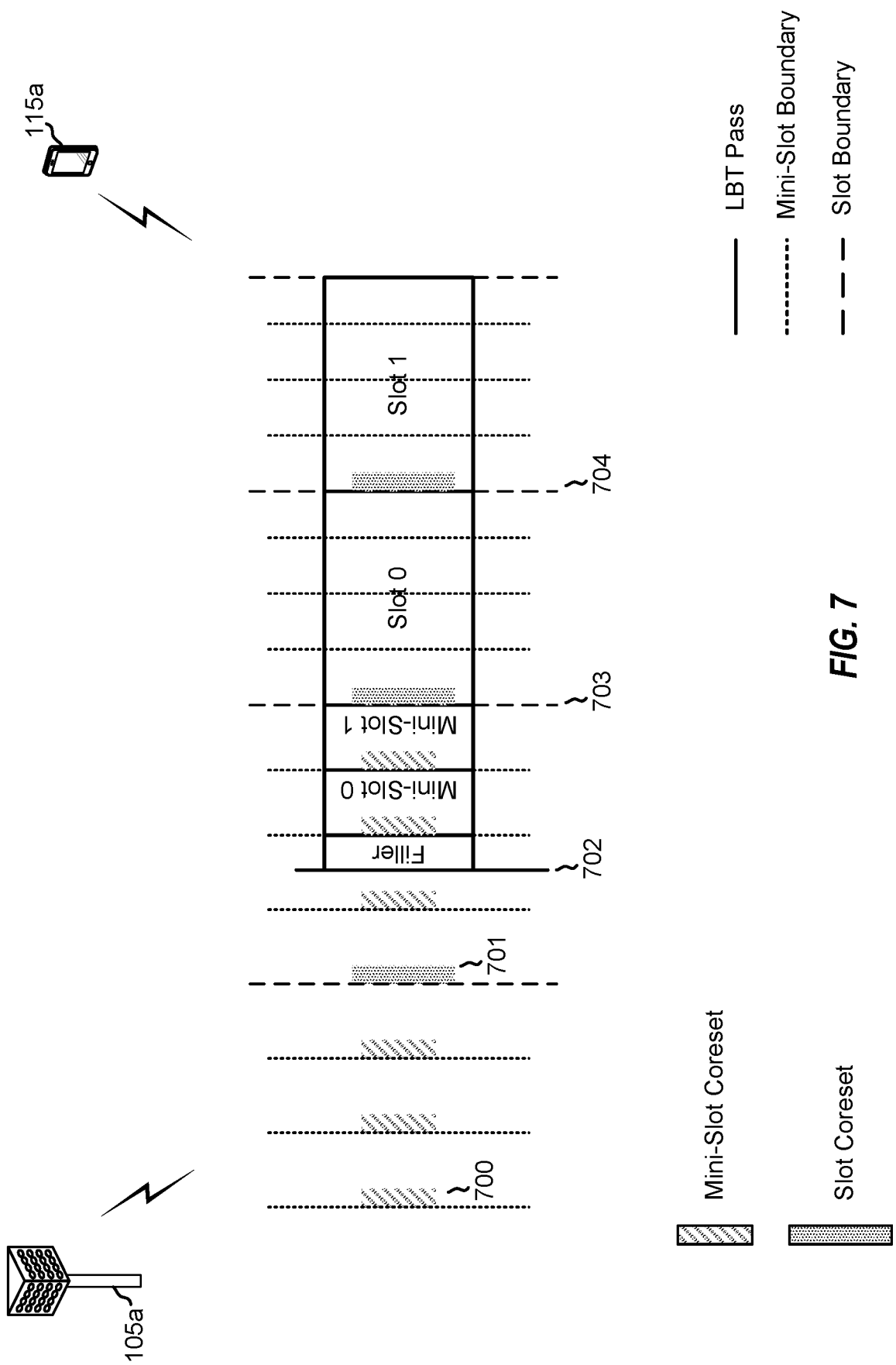
FIG. 7 is a block diagram illustrating a base station and UE configured with a mini-slot based design according to aspects of the present disclosure.

FIG. 7 is a block diagram illustrating base station 105a and UE 115a configured with a mini-slot based design according to aspects of the present disclosure. As noted above with respect to FIG. 6, during idle times, UE 115a may wake up to monitor for coreset transmissions at each potential transmission unit. Here, each transmission unit includes all mini-slots and the system or transmission slot boundaries. A mini-slot coreset 700 may be transmitted by base station 105a at each mini-slot boundary, while a slot coreset 701 may be transmitted by base station 105a at each system slot boundary. At 702, base station 105a detects the LBT pass and begins transmitting filler signals to occupy the shared communication channel. UE 115a may recognize this as the beginning of the transmission opportunity. At that point, UE 115a modifies the frequency with which it monitors for coreset transmissions. Because UE 115a is configured for mini-slot operations, it will monitor for mini-slot coresets 700 at both of mini-slot 0 and 1, and then only monitor for slot coresets 701 at the next system slot boundaries, 703 and 704. During the transmission opportunity, UE 115a would not continue monitoring for every mini-slot.

Figure 8:
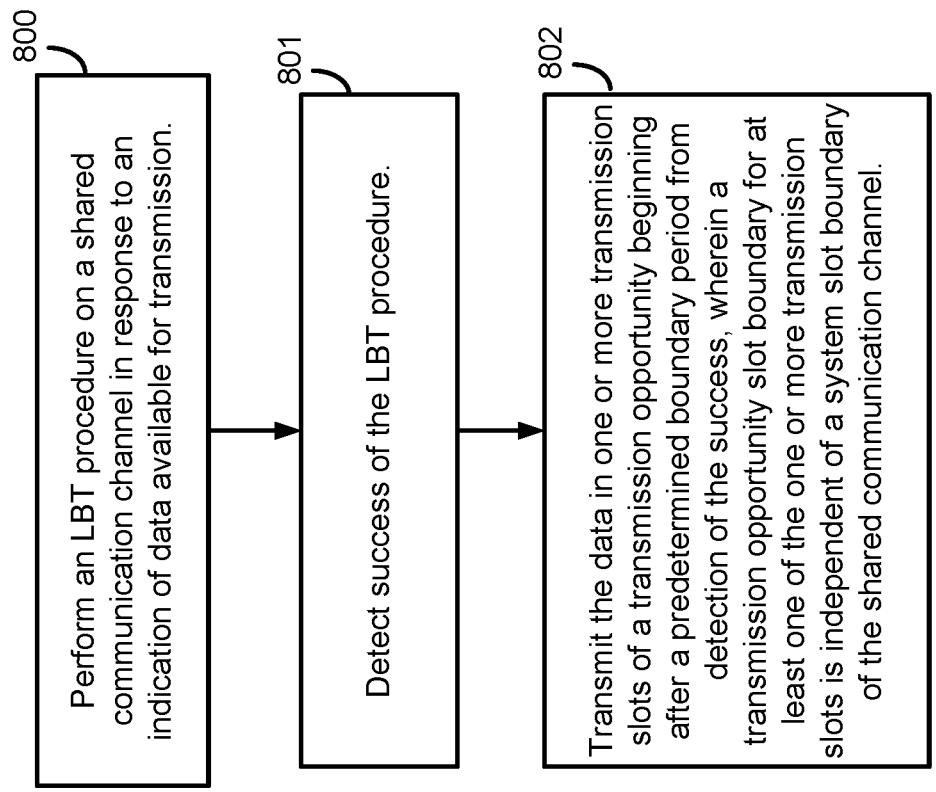
FIG. 8 is a block diagram illustrating example blocks executed to implement one aspect of the present disclosure.

FIG. 8 is a block diagram illustrating example blocks executed to implement one aspect of the present disclosure. The example blocks will also be described with respect to base station 105 as illustrated in FIG. 22. An alternative to the mini-slot based design for transmission starting points, various aspects of the present disclosure provide for a floating slot based design.

At block 800, a base station performs an LBT procedure on a shared communication channel in response to an indication of data available for transmission. Base station 105 will attempt to secure access to the shared communication channel using an LBT procedure, initiated by execution of LBT logic 2201, when it has data for transmission to one or more of its served UEs.

At block 801, the base station detects success of the LBT procedure. The base station may not begin transmissions until the LBT procedure has been determined successful. Accordingly, base station 105, within the execution environment of LBT logic 2201, will monitor for success of the LBT.

At block 802, the base station transmits the data in one or more transmission slots of a transmission opportunity beginning after a predetermined boundary period from detection of the success, wherein a transmission opportunity slot boundary for at least one of the transmission slots is independent of a system slot boundary of the shared communication channel. According to the floating slot based design, when base station detects 105 the LBT pass, it begins transmission via wireless radios 2200a-t and antennas 234a-t in regular slot lengths using a transmission slot boundary in relation to the LBT pass detection that is independent of the system slot boundary. Base station 105 maintains the system slot information at system slot timing 2204, in memory 242, and, after beginning the TxOP will establish the transmission slot boundary and stored the transmission timing at transmission slot timing 2204, in memory 242. Therefore, transmissions occur according to a TxOP-based slot.

In the floating slot based design, the TxOP has no fixed system slot boundary, but defines a transmission slot boundary. The transmission slot boundary can occur over various time frames, such as 1-slot, 2-symbols, 7-symbol, etc. The base station may transmit a filler, reservation, or occupation signal between detecting the LBT pass and the next transmission slot boundary. The denser or more frequency the transmission slot boundaries, the less filler signal would be transmitted. The TxOP transmissions are made in slot units starting from the transmission slot boundary where the TxOP starts. For uplink transmission, the floating slot boundary may not be practical when there are multiple UEs being served. For example, on the uplink side, an uplink transmission slot boundary would depend on the UE side LBT pass timing. This timing will not necessarily align with the downlink transmission slot boundary. Moreover, different UEs may have different uplink transmissions slot boundaries, which will make processing and overhead much more complex.

Figure 9:
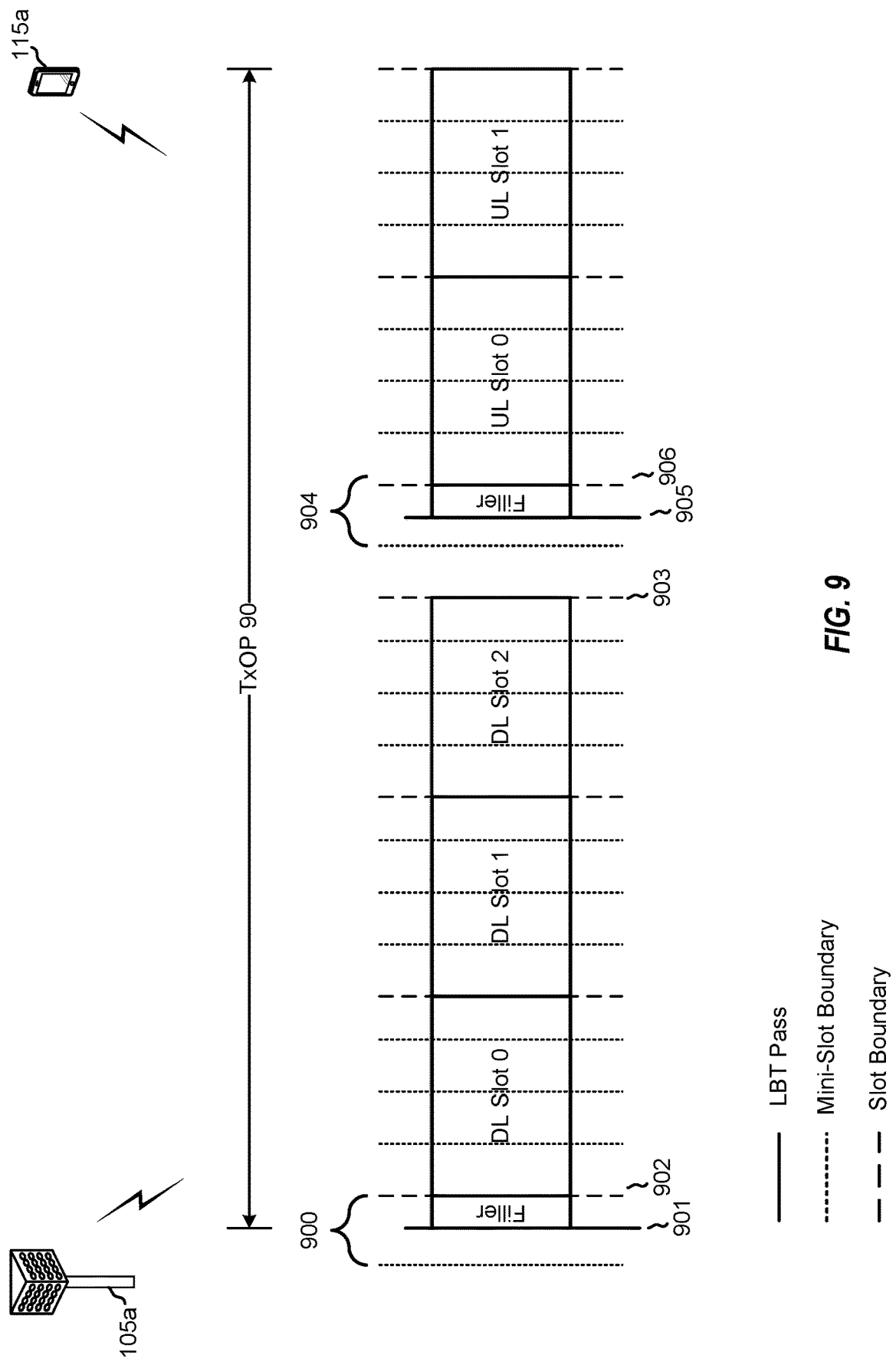
FIG. 9 is a block diagram illustrating a base station and UE configured with a floating slot based design according to aspects of the present disclosure.

FIG. 9 is a block diagram illustrating base station 105a and UE 115a configured with a floating slot based design according to aspects of the present disclosure. As base station 105a identifies data for downlink transmission to UE 115a, it begins an LBT procedure to secure access to the shared communication channel. The transmissions over the shared communication channel are divided into slots and mini-slots. In mini-slot 900, base station 105a detects the successful LBT at 901 and begins transmitting filler signals. Once the filler signals are transmitted, base station 105a may begin slot transmissions at transmission slot boundary 902. From Transmission slot boundary 902, base station 105a may perform downlink transmissions using a slot transmission unit based on transmission slot boundary. This slot transmission is independent from a system slot boundary or timing.

After completion of DL slot 2 at 903, UE 115a may perform an LBT procedure for its uplink transmissions. With a single UE being served, UE 115a may also use a floating slot based design. At 905, UE 115a detects the LBT pass in the middle of mini-slot 904. After transmission of filler signaling, it also may begin its uplink transmission at uplink transmission slot boundary 906. The timing of uplink transmission slot boundary 906 is independent of both the system slot boundary and the downlink timing of transmission slot boundary 902.

Figure 10:
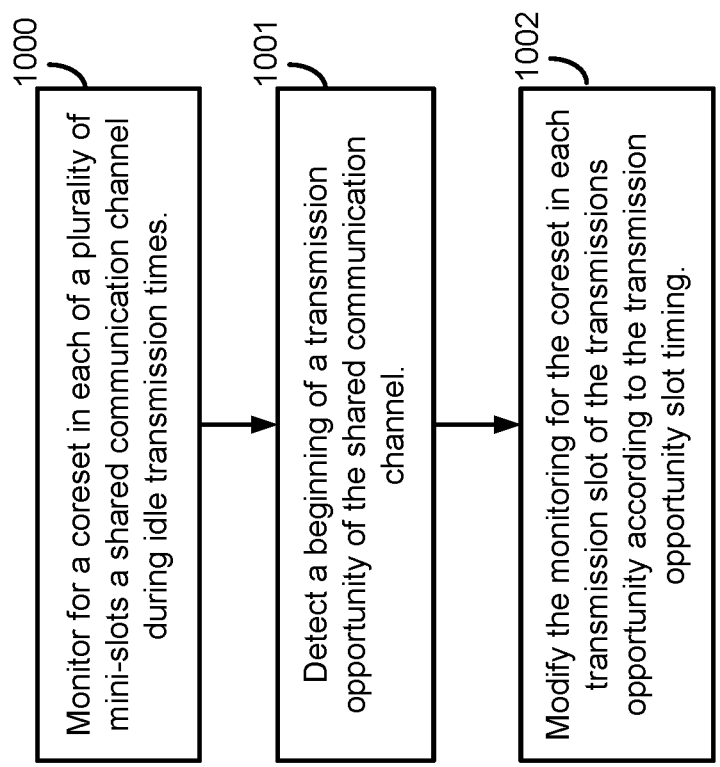
FIG. 10 is a block diagram illustrating example blocks executed to implement one aspect of the present disclosure.

FIG. 10 is a block diagram illustrating example blocks executed to implement one aspect of the present disclosure. The example blocks will also be described with respect to UE 115 as illustrated in FIG. 23.

At block 1000, a UE monitors for a coreset in each of a plurality of mini-slots of a shared communication channel during idle transmission times. UE 115 executes, under control of controller/processor 280, Coreset monitoring function 2301, stored in memory 282. The execution environment of Coreset monitoring function 2301 allows for UE 115 to identify Coreset transmissions in signals detected via antennas 252a-r and wireless radios 2300a-r. During idle mode times, UE 115 will monitor for such Coreset transmissions in each mini-slot of the shared channel.

At block 1001, the UE detects a beginning of a transmission opportunity of the shared communication channel. During the idle times, UE 115 will also monitor for the beginning of TxOP. When the TxOP is detected, UE 115 may switch into an active mode in preparation to receive downlink communications. As the signals are detected via antennas 252a-r and wireless radios 2300a-r, UE 115 executes, under control of controller/processor 280, coding/decoding logic 2302 to decode the signals. Coding/decoding logic 2302 may, thus, decode detected signals and determine such signals correspond to the initial transmission from a serving base station. UE 115 may, thus, determine the beginning of the TxOP based on the decoded signals received.

At block 1002, the UE modifies the monitoring for the coreset in each transmission slot of the transmissions opportunity according to the transmission opportunity slot timing. As noted above, during idle times, UE 115 will wake up to monitor for coreset information at each potential transmission unit. However, once a TxOP has begun, coreset information would be transmitted at the transmission slot boundaries. Therefore, when UE 115 detects the beginning of the TxOP in block 505, it may then modify Coreset monitoring function 2301 to modify the monitoring to each communication slot (e.g., mini-slot or slot) of the TxOP.

Figure 11:
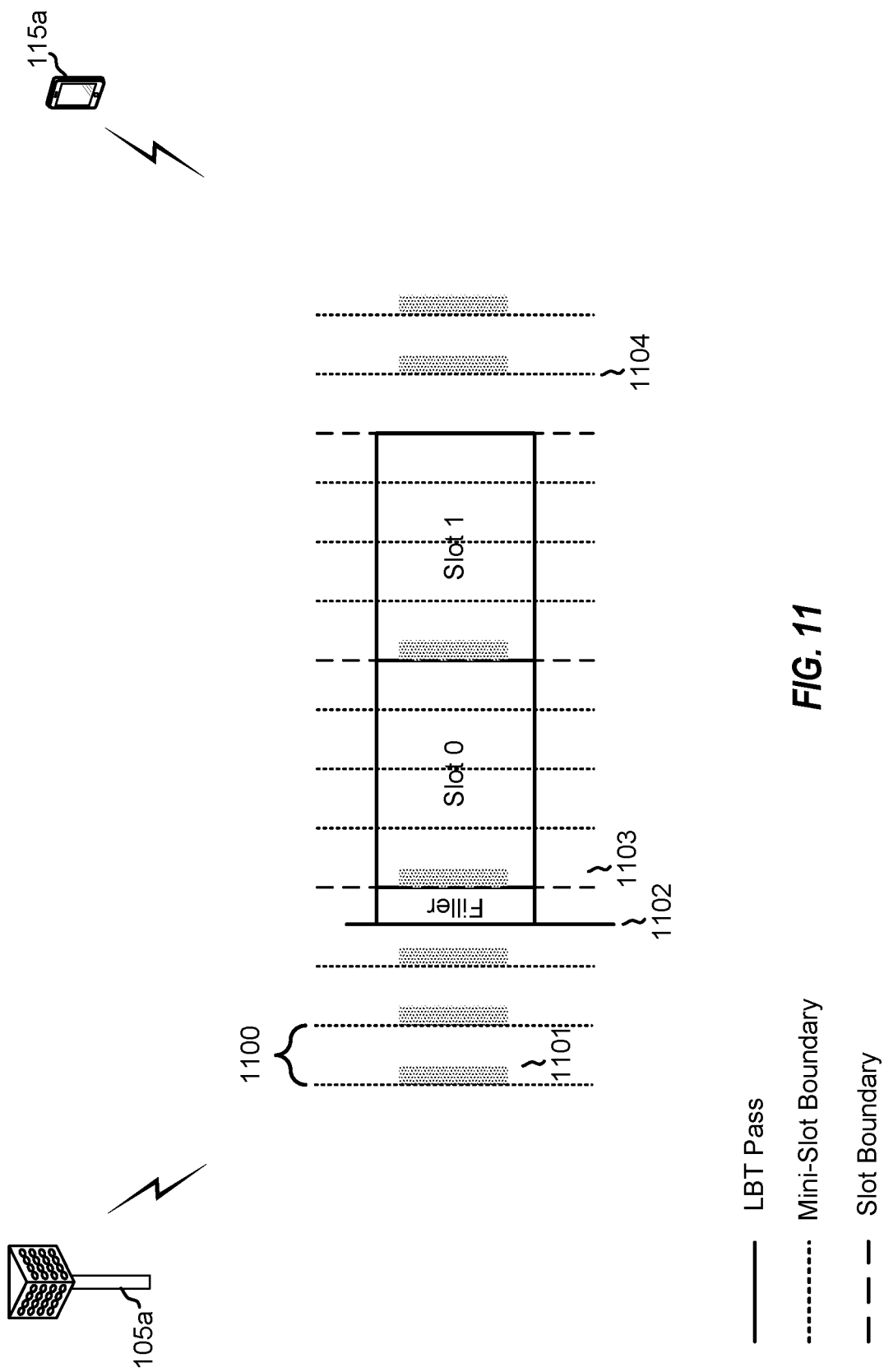
FIG. 11 is a block diagram illustrating a base station and UE configured according to one aspect of the present disclosure.

FIG. 11 is a block diagram illustrating base station 105a and UE 115a configured according to one aspect of the present disclosure. Within the floating slot based design for transmission starts, the potential transmission starts may begin at mini-slot intervals. While in an idle state, UE 115a may monitor for coreset transmissions 1101 from base station 105a every mini-slot 1100. As in the mini-slot design based aspects, once UE 115a detects the success of the LBT procedure at 1102, UE 115a may reduce the monitoring frequency to each transmission slot boundary 1103. Once the TxOP ends and transmissions cease in slots 1 and 2, UE 115a may resume monitoring for coreset transmissions 1101 every mini-slot at 1103.

Aspects of the present disclosure configured using the floating slot based design may be more transmitter friendly. For example a base station, such as base station 105a may prepare one packet and delay the transmission of that packet until the LBT passes later. Because the TxOP begins at the next transmission slot boundary after detecting the LBT pass, there is no need to prepare multiple packets that may be dropped as the LBT pass comes later within the shared channel. The resulting procedure allows for simpler control logic in the base station/scheduler. However, rate matching issues may arise as the different transmission starting times may imply different sets of REs to rate match around.

Figure 12:
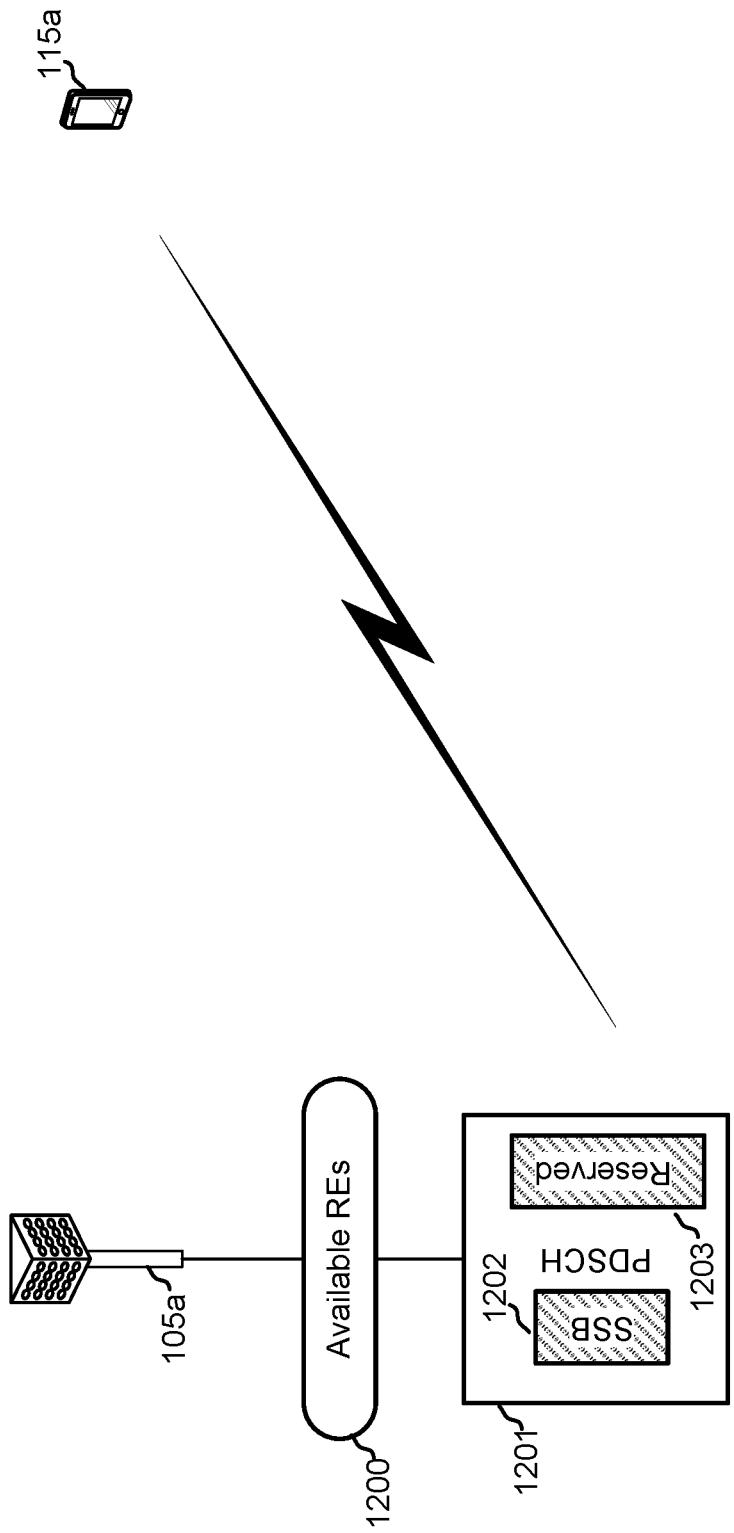
FIG. 12 is a block diagram illustrating a base station and UE configured according to one aspect of the present disclosure.

FIG. 12 is a block diagram illustrating base station 105a and UE 115a configured according to one aspect of the present disclosure. In a first option for rate matching, it may be beneficial not to pre-rate match before the exact set of REs is known. For example, base station 105a with data for downlink transmission to UE 115a does not generate PDSCH 1201 until after it determines available REs 1200 for the transmission. Using available REs 1200, base station 105a may rate match PDSCH 1101 around rate matching resources, such as synchronization signal block (SSB) 1202 and reserved REs 1203. Reserved REs 1203 may include remaining minimum system information (RMSI) coreset, etc. Base station 105a may then transmit PDSCH 1201 to UE 115a.

When the LBT pass is detected in the middle of a mini-slot, the rate matching may be performed while any filler or channel reservation/occupancy signals are transmitted. For the selected slot start, base station 105 may figure out the available number of REs and split the REs to all code blocks. The TBS would not change and, thus, re-encoding would not be necessary. Base station 105a will pick the right number of coded bits from the rate matching circular buffer of each CB to fill the number of REs. Alternatively, each RE's modulation (e.g., multiple spatial layers) can be performed ahead of time, with the pre-modulated REs being filled into the available REs when transmission timing is done. This way, the modulation is performed ahead of time and the RE multiplexing, precoding, and time domain waveform generation may be performed at transmission time.

It should be noted that in the case where a channel reservation signal may not be available, and the PDSCH can happen in symbol 0 of a transmission slot (e.g. the REs outside coreset), aspects of the present disclosure may use a special default rate matching rule.

Figure 13:
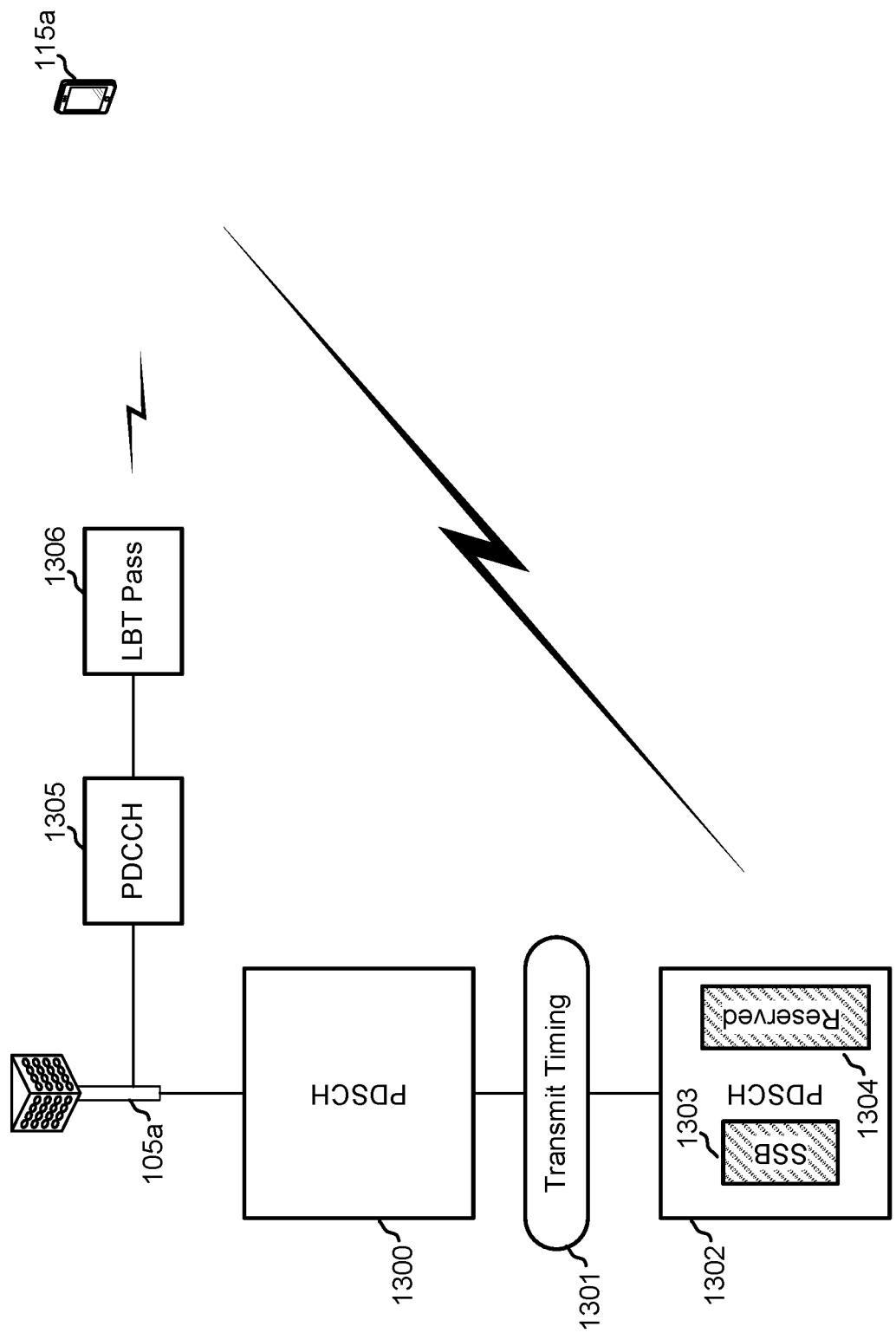
FIG. 13 is a block diagram illustrating a base station and UE configured according to one aspect of the present disclosure.

FIG. 13 is a block diagram illustrating a base station 105a and UE 115a configured according to one aspect of the present disclosure. In a second option for rate matching, a puncturing-based design provides for pre-generating the REs and pre-filling into an OFDM symbol or a physical RE structure. The precoding may also be pre-computed. Thus, with the data for downlink transmission, base station 105a pre-generates PDSCH 1300 with the data. When slot transmission timing 1301 is known, and the rate matching resources determined, base station 105a may puncture the REs from the OFDM symbols of generated PDSCH, PDSCH 1300 to fill the other reserved signal resources to be transmitted, such as SSB 1202 and reserved REs 1303. The time domain waveform may then be formed of the punctured PDSCH 1300 and transmitted to UE 115a. On UE side, when UE 115a detects a PDCCH at a floating location from the starting location, UE 115a determines this is a floating slot. UE 115a can derive the original system slot location by using the original system slot structure to de-rate match and use the current location to find out which REs have been punctured in PDSCH 1300.

Re-generating PDCCH may also take considerable time. Therefore, aspects of the present disclosure provide for pre-generating PDCCH 1305 and delay the transmission until base station 105a detects LBT pass 1306. Because of the floating transmission slot boundary, timing based scrambling using the transmission slot boundary timing may not be effective. In such aspects, base station 105a may remove or restrict the amount of timing based scrambling that is applied to PDCCH 1305. For example, base station 105a may scramble PDCCH 1305 using the demodulation reference signal (DMRS). In additional alternative aspects, a middle solution may be performed such that the scrambling value changes along the system slot boundary timing and not the transmission slot boundary timing. Thus, UE 115a may be able to determine the scrambling by use the system slot boundary timing.

Figure 14:
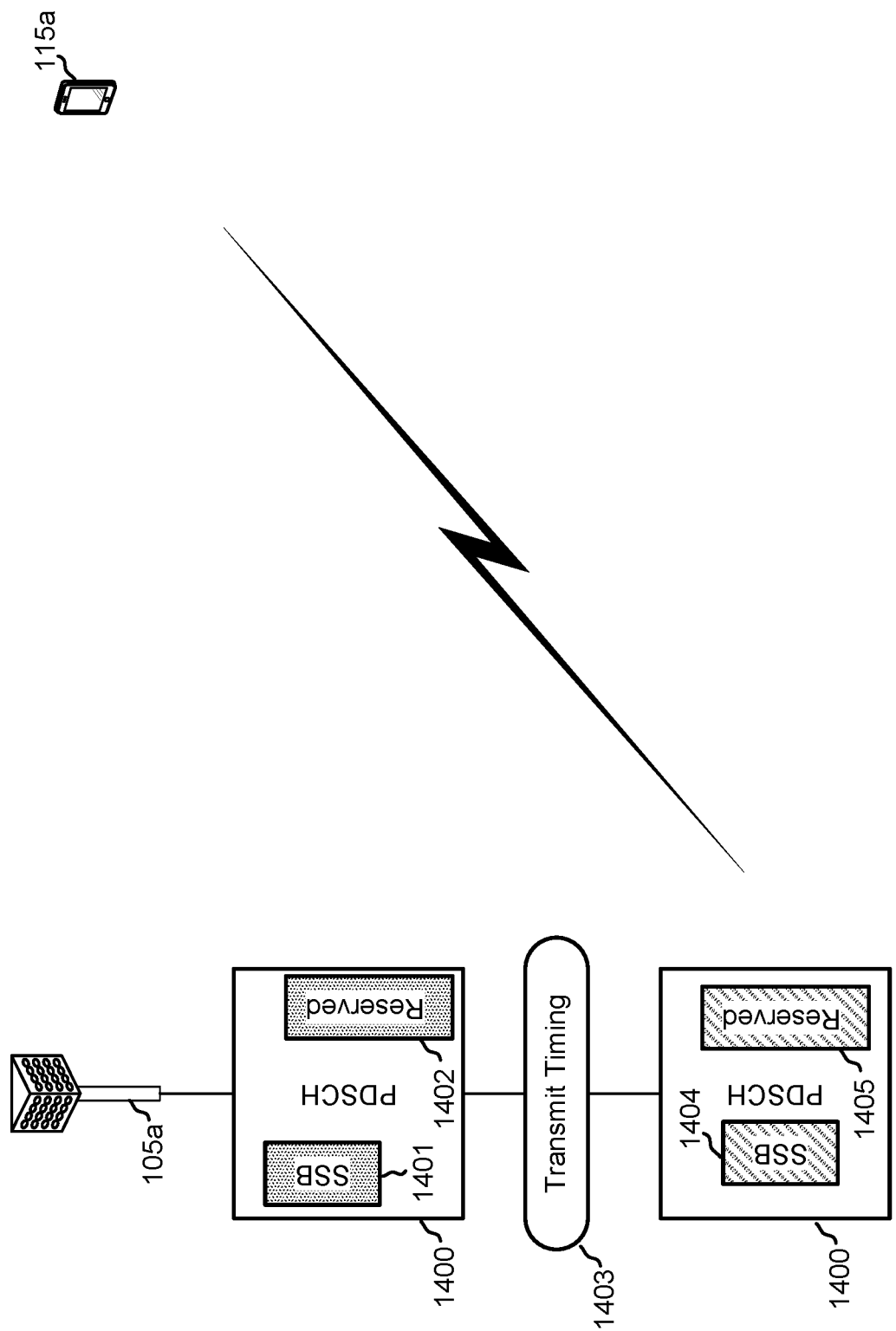
FIG. 14 is a block diagram illustrating a base station and UE configured according to one aspect of the present disclosure.

FIG. 14 is a block diagram illustrating base station 105a and UE 115a configured according to one aspect of the present disclosure. Instead of pre-generating PDSCH 1300 (FIG. 13) and then puncturing once transmission timing 1301 (FIG. 13) is determined, the aspects described in FIG. 14 provide for base station 105a to pre-generate PDSCH 1400 to already include placeholder puncturings for any reserved signals, such as SSB 1401 and reserved REs 1402. At the pre-generation stage, the locations of SSB 1401 and reserved REs 1402 may not be exactly identical to the actual locations that may be determined when transmission timing 1403 is obtained. When base station 105a is able to determine the exact locations of the reserved signals using transmission timing 1403, base station 105a may shift the locations of the reserved signals within the pre-generated PDSCH 1400 to the exact locations of SSB 1404 and reserved REs 1405. Base station 105a may then transmit PDSCH 1400 to UE 115a with the locations for SSB 1404 and reserved REs 1405 punctured. However, the pre-generating of PDSCH 1400 with placeholders for the puncturings allows base station 105a to reduce the amount of data lost via the puncturing.

FIGS. 15A and 15B are block diagrams illustrating base station 105a and UE 115a configured according to aspects of the present disclosure. As noted above, the pre-generated PDCCH, PDCCH 1305 (FIG. 13) is pre-generated before detecting the LBT pass and then transmitted after LBT pass. Because PDCCH 1305 is pre-generated prior to knowing the transmission timing, there may be occasions where PDCCH 1305 collides with reserved REs, such as an SSB. The aspects illustrated in FIGS. 15A and 15B provide optional procedures for addressing such signal collision.

In a first option illustrated in FIG. 15A, base station 105a configures the coreset transmissions 1500 at locations that will avoid colliding with SSB 1502. In such aspects, the coreset transmissions 1500 are configured and will be transmitted at the configured locations regardless of whether SSB 1502 is transmitted in the same mini-slot/slot or not.

In the second option illustrated in FIG. 15B, base station 105a knows when the coreset transmission 1502 will collide with SSB 1503. When a collision will take place, base station may shift or rate match coreset transmissions 1502 around the location of SSB 1503. In one example, in mini-slot 1504, coreset transmissions 1502 may be transmitted at the first location in mini-slot 1504 for any transmissions that may occur within mini-slot 1504 and coreset transmissions 1502 may also be transmitted at the last location in mini-slot 1504 to accommodate transmission in the next slot, where SSB 1503 would otherwise have collided with coreset transmissions 1502 if it had been transmitted in the next mini-slot. Thus, when base station 105a determines there will be a collision with SSB 1503, base station 105a will move the location of coreset transmissions 1502 to avoid the collision.

It should be noted that there may be circumstances in which SSB should not float. The SSB can follow the system slot timing. From the UE perspective, UE 115a may determine the system slot timing using the indication from the SSB. Under the aspects using a floating slot based TxOP, for each TxOP, there is another "dynamic" slot timing concept, the transmission slot boundary, that is independent of the system slot boundary and timing. Others of the RE sources, such as RMSI, broadcast OSI, and the like may be allowed to flow, in which base station 105a may configure a window for UE 115a to monitor for RMSI coreset transmissions.

Figure 16:
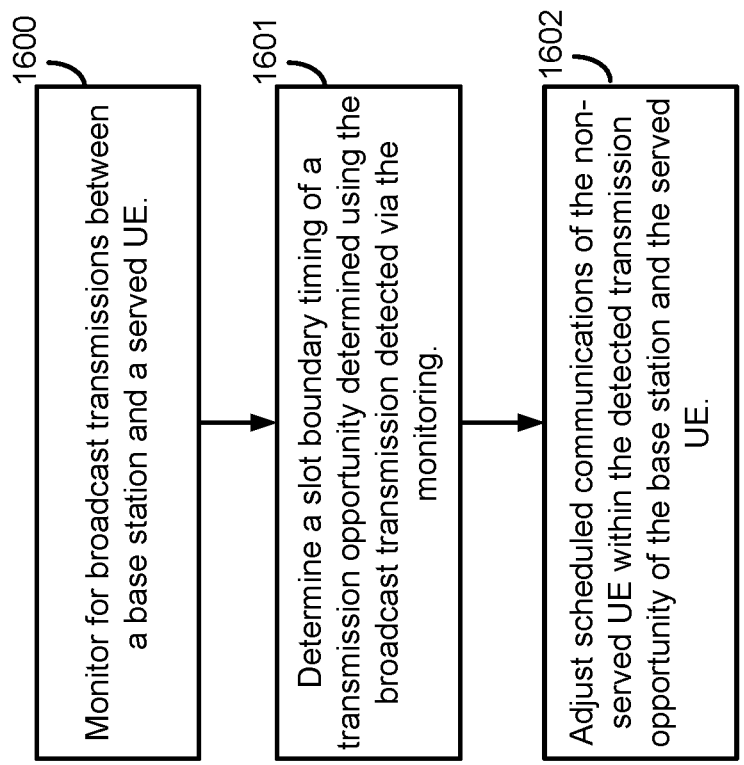
FIG. 16 is a block diagram illustrating example blocks executed to implement one aspect of the present disclosure.

FIG. 16 is a block diagram illustrating example blocks executed to implement one aspect of the present disclosure. The example blocks will also be described with respect to UE 115 as illustrated in FIG. 23.

At block 1600, a non-served UE monitors for broadcast transmissions between a base station and a served UE. Non-serving UEs, such as UE 115, are those not having a grant in the current TxOP, but which are radio resource control (RRC) configured to perform some reception/transmission at certain time. With the slot boundary floating according to the presently described aspect, defining the timing for these receptions and transmissions may include further considerations. Such non-grant based transmission may include channel state information (CSI) reference signals (CSI-RS) for CSI acquisition, sounding reference signals (SRS) transmissions, and the like. As the signals are detected via antennas 252*a-r* and wireless radios 2300*a-r*, UE 115 executes, under control of controller/processor 280, coding/decoding logic 2302 to decode the signals. Coding/decoding logic 2302 may, thus, decode detected signals and determine such signals correspond to the transmissions between a base station and another neighboring UE.

At block 1601, the non-served UE determines a slot boundary timing of a transmission opportunity determined using the broadcast transmission detected via the monitoring. Basically the non-serving UEs, UE 115, detect the timing for the slot boundary for all scheduled operations based on the decoded signals decoded through execution of coding/decoding logic 2302.

At block 1602, the non-served UE adjusts scheduled communications of the non-served UE within the detected transmission opportunity of the base station and the served UE. There is no grant for the non-serving UEs, such as UE 115. Therefore, a different signal or a broadcast layer 1 (L1) channel may be used for the transmission. In a first option, if available, a wideband DMRS may be used for the coreset transmission. In such case, no additional information is used. In a second option, a dedicated L1 channel, such as group control (GC)-PDCCH carrying SFI, and can piggy back other triggers in the L1 channel as well, such as SRS trigger, CSI-RS indication, PRACH trigger, SR trigger etc. Using this information, UE 115 determines a transmission timing adjustment 2304 which is used to adjust the transmission of the signals that the non-served UE, UE 115, is scheduled for.

From the UE perspective, if there is only one UE in the uplink burst, the same ideas to use a floating slot design can be applied. This helps UE 115*a* process as well, as the PUSCH can be pre-generated by UE 115*a*. In uplink transmissions, there is not much to rate match around, so the rate matching can be pre-generated. If LBT passes later, the transmission of the pre-generated PUSCH may just be delayed until the LBT passes. As noted above with regard to PDCCH, UE 115*a* may avoid timing dependent scrambling of the PUSCH as well. When there are more than two UEs at issue, the two UEs with PUSCH, or multiple UEs with a mix of SRS, PUCCH, and PUSCH may use a kind of synchronization across UEs, with a per UE LBT being insufficient to provide such synchronization.

An alternative implementation may include not floating the slot boundary with respect to downlink, but to bundle with the downlink slot boundary of the same TxOP, or with a base station-indicated timing offset. When the LBT passes at a later time between mini-slot boundaries, puncturing may be used to accommodate the transmission, similar as LTE-LAA/MF behavior. Additional considerations for puncturing include how to handle DMRS and how the base station would know which symbols are punctured, as detected from the start of the uplink burst.

Figure 17:
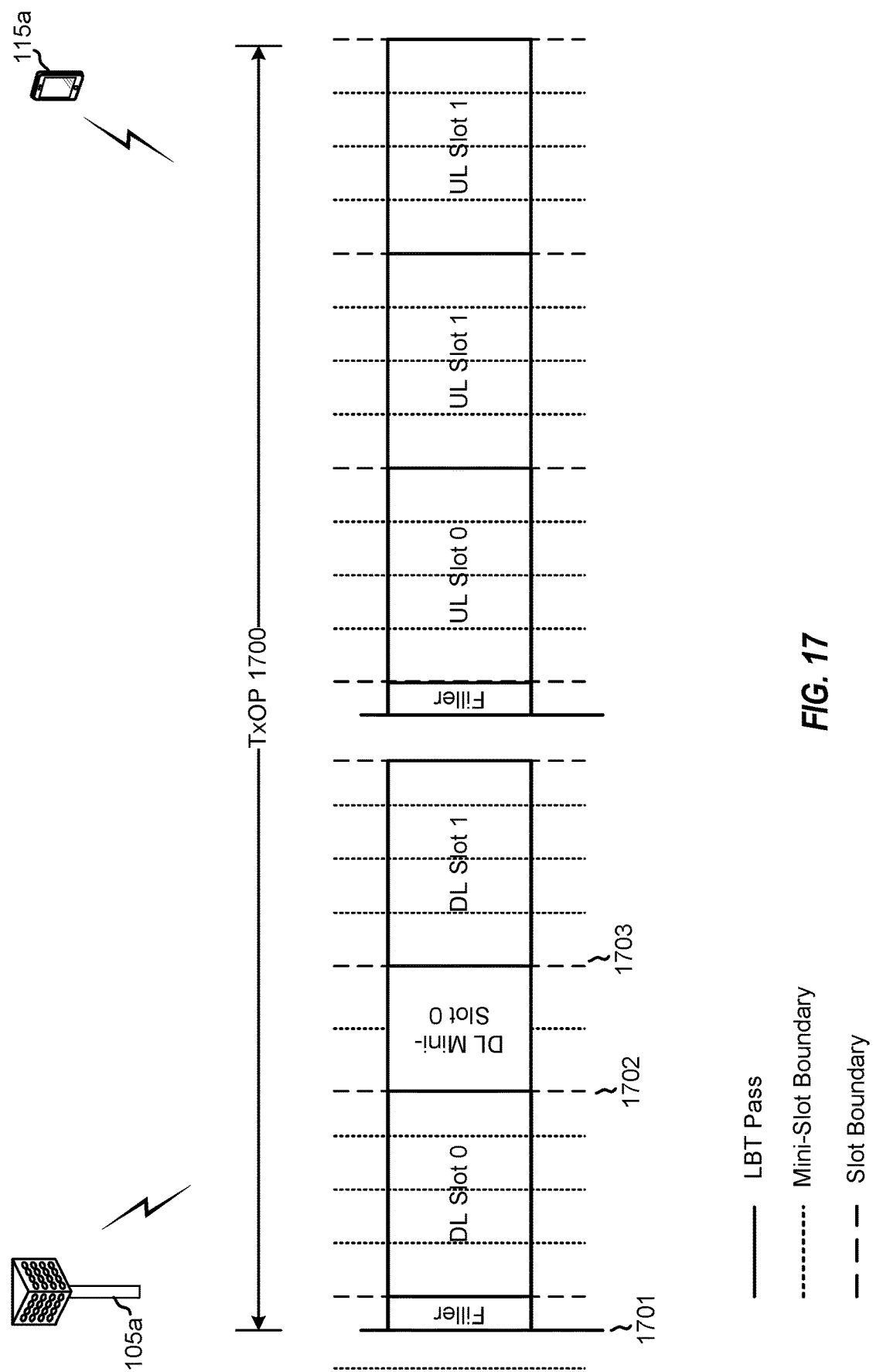
FIG. 17 is a block diagram illustrating a base station and UE configured according to one aspect of the present disclosure.

FIG. 17 is a block diagram illustrating a base station 105*a* and UE 115*a* configured according to one aspect of the present disclosure. In the described aspect, the first slot, DL slot 0 of TxOP 1700, is pre-prepared and floating after detecting LBT pass at 1701 and transmitting the filler signaling, but in the middle of the downlink burst burst, a few mini-slot grants are used for DL mini-slot 0 AT 1702 to align the timing back to the system slot timing. Thus, the first pre-prepared downlink slot is floating, while the others beginning at system slot boundary 1703, after the "corrective" DL mini-slot 0, are not. Correcting to the system slot timing benefits downlink transmissions due to the potential rate matching of SSB transmissions. The benefit is observed for a large portion of the burst, where the timing is then aligned with the SSB timing. As a result, the procedure for SSB rate matching would simply be used in the pre-prepared first floating slot, DL slot 0.

Figures 18A, 18B:
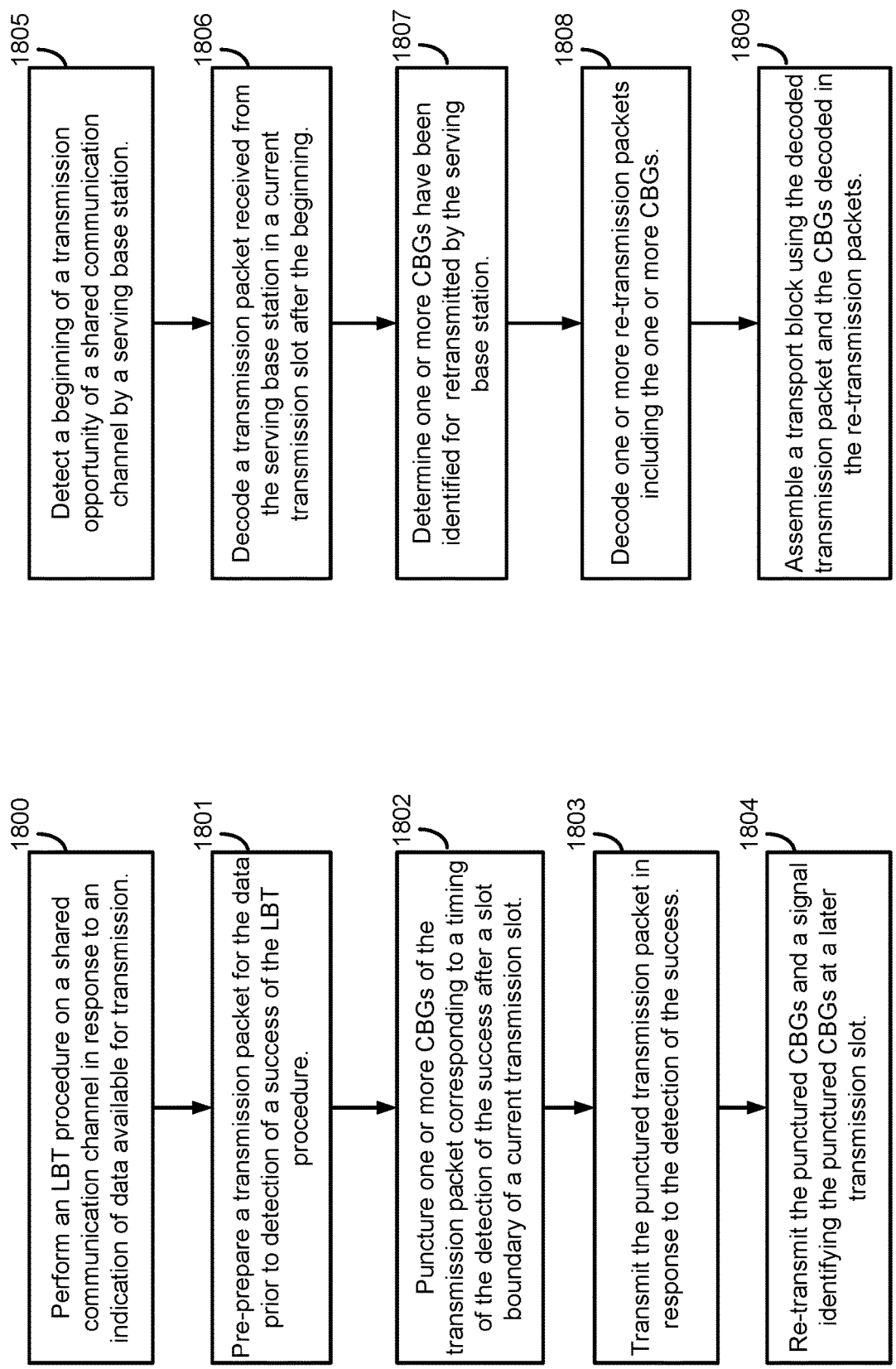
FIGS. 18A and 18B are block diagrams illustrating example blocks executed by a base station to implement one aspect of the present disclosure.

FIG. 18A is a block diagram illustrating example blocks executed by a base station to implement one aspect of the present disclosure. The example blocks will also be described with respect to base station 105 as illustrated in FIG. 22. An alternative to both the mini-slot based and floating slot based designs for transmission starting points, various aspects of the present disclosure provide for a punctured slot based design with code block group (CBG) level retransmission.

At 1800, a base station performs an LBT procedure on a shared communication channel in response to an indication of data available for transmission. As before, base station 105 will attempt to secure access to the shared communication channel using an LBT procedure, initiated by execution of LBT logic 2201, when it has data for transmission to one or more of its served UEs.

At block 1801, the base station pre-prepares a transmission packet for the data prior to detection of a success of the LBT procedure. In order to begin transmitting the data as soon as possible, base station 105 would pre-prepare the transmission packet based on the expected REs. Bbase station 105 executes, under control of controller/processor 240, packet generator 2202, stored in memory 242, to pre-prepare the transmission packet after initiation of the LBT, but prior to detecting its success.

At block 1802, the base station punctures one or more CBGs of the transmission packet corresponding to a timing of the detection of the success after a slot boundary of a current transmission slot. NR systems are configured for CBG-based retransmission support. As a result, transmissions may be more "puncture friendly," as puncturing at the CBG level allows for a more granular ability to retransmit the punctured CBGs. With the pre-prepared packet ready while base station 105 is waiting to detect the result of the LBT procedure, as the time progresses beyond a point where a CBG of the pre-prepared packet would be transmitted, base station 105 identifies that CBG for retransmission within the execution environment of LBT logic 2201 and schedules retransmission via Re-TX controller 2204, in memory 240. Base station 105 executes packet generator 2202 to pre-prepare the pre-prepared packet using only the remaining CBGs not identified for retransmission. The pre-prepared packet, therefore, does not simply drop the identified CBGs, but gathers the identified CBGs for retransmission. As such, while the process is described herein as "puncturing," the it could be referred to as modified puncturing, since the data of the CBGs is not simply dropped.

At block 1803, the base station transmits the punctured transmission packet in response to the detection of the success. When base station 105 detects the LBT pass, the remaining punctured transmission packet (without the CBGs identified for retransmission) is transmitted to the served UE via wireless radios 2200*a-t* and antennas 234*a-t*.

At block 1804, the base station re-transmits the punctured CBGs and a signal identifying the punctured CBGs at a later transmission slot. As base station 105 identifies the CBGs to puncture from the pre-prepared transmission slot, it may immediately begin re-transmission procedures for those identified CBGs via execution of Re-TX controller 2205. In such case, base station 105 can scheduled the re-transmission via Re-TX controller 2205 as soon as possible, including even in later slots of the same TxOP, and then retransmit the identified CBGs via wireless radios 2200a-t and antennas 234a-t.

FIG. 18B is a block diagram illustrating example blocks executed by a UE to implement one aspect of the present disclosure. The example blocks will also be described with respect to UE 115 as illustrated in FIG. 23.

At block 1805, a UE detects a beginning of a transmission opportunity of a shared communication channel by a serving base station. On the UE side of the punctured slot based design with CBG retransmission, the UE will need to stitch together the different CBGs in order to recover the whole transport block (TB) from the base station. Accordingly, while in idle mode, the UE will monitor for the beginning of a TxOP over the shared communication channel. As the signals are detected via antennas 252a-r and wireless radios 2300a-r, UE 115 executes, under control of controller/processor 280, coding/decoding logic 2302 to decode the signals. Coding/decoding logic 2302 may, thus, decode detected signals and determine such signals correspond to the beginning of the TxOP.

At block 1806, the UE decodes a transmission packet received from the serving base station in a current transmission slot after the beginning. As UE 115 begins receiving data packets from the serving base station it will decode the received packets via execution of coding/decoding 2302.

At block 1807, the UE determines one or more CBGs have been identified for retransmitted by the serving base station. On decoding the first packet, UE 115 will determine that all of the CBGs for that packet were not included in the transmission. UE 115 would then determine that some of the CBGs have been identified for retransmission. Re-TX controller 2305 maintains the identified CBGs that have been identified for retransmission.

At block 1808, the UE decodes one or more re-transmission packets including the one or more CBGs. UE 115 will receive the retransmission packets via antennas 252a-r and wireless radios 2300a-r that include the "punctured" CBGs from the initial transmission packet. UE 115, within the execution environment of coding/decoding 2302, may also decode an identifier from the base station that identifies the CBGs as the retransmitted CBGs from the initial packet.

At block 1809, the UE assembles a transport block using the decoded transmission packet and the CBGs decoded in the re-transmission packets. UE 115 stores the CBGs of the initial packet in memory 282 and when the retransmitted CBGs are decoded along with the identifier, UE 115 executes Tx block assembler 2306 to then assemble the CBGs to form the whole transport block.

Figure 19:
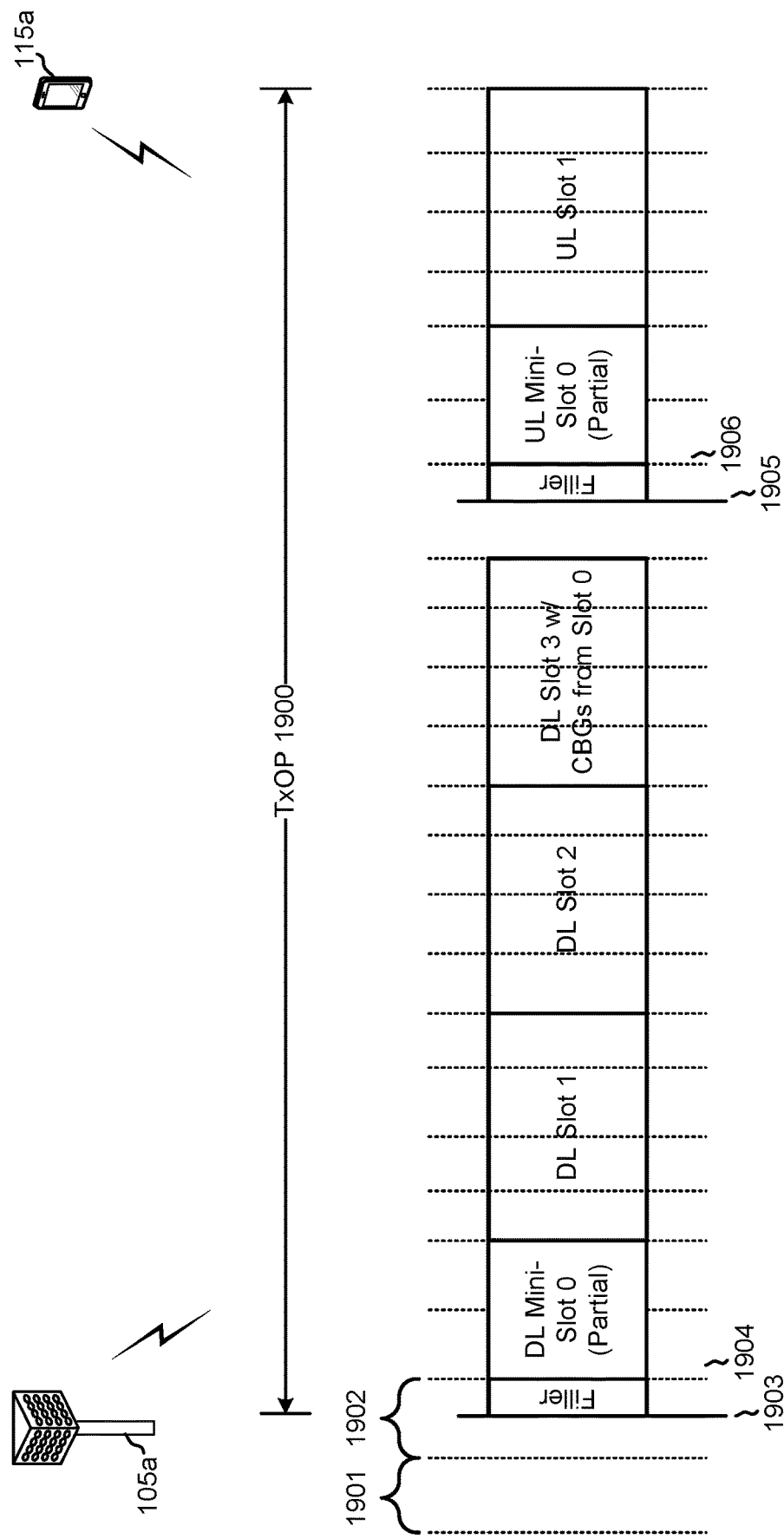
FIG. 19 is a block diagram illustrating a base station and UE configured according to one aspect of the present disclosure.

FIG. 19 is a block diagram illustrating base station 105a and UE 115a configured according to one aspect of the present disclosure. Base station 105a, having data to transmit to UE 115a, performs and LBT procedure and monitors for the result. Upon performing the LBT procedure, base station 105a also pre-prepares a transmission packet that will be transmitted after any filler or channel reservation signaling is completed. The pre-prepared packet may include data for a slot that covers four mini-slots. Base station 105a fails to detect the LBT result in mini-slot 1901, but detects the LBT pass at 1903, in the middle of the second mini-slot 1902. At 1903, base station 105a would then begin transmitting the filler signaling. As the boundaries of mini-slots 1901 and 1902 are passed without detecting the LBT pass, base station 105a identifies the CBGs that would have been transmitted in mini-slots 1901 and 1902 for retransmission, thus, puncturing them from the originally pre-prepared transmission packet. Base station 105a will send a partial packet, DL mini-slot 0 (partial), formed by "puncturing" the CBGs for slots 1901 and 1902 from the pre-prepared transmission packet, at slot boundary 1904.

Base station 105a knows which part of the pre-prepared transmission packet is punctured and can re-transmit the CBGs of the punctured part, possibly in the same TxOP, but a later slot. For example, base station 105a schedules the punctured CBGs to be retransmitted during the last slot of the downlink burst, DL slot 3. In the retransmission, base station 105a also includes an indicator that indicates which CBGs are included in the retransmission. Thus, DL slot 3 would include an indicator to the UE that DL slot 3 includes the CBGs punctured from DL slot 0.

When providing the control signaling via PDCCH, re-generating the PDCCH after determining which CBGs are punctured from the pre-generated PDSCH may take considerable time from base station 105a. Accordingly, additional and alternative aspects of the present disclosure may pre-generate PDCCH and delay the transmission by base station 105a until LBT pass is detected at 1901, similar to the floating slot based design. In such aspects, the PDCCH will not depend on when the transmission happens, but will also not reflect which CBGs will be punctured from the pre-generated PDSCH. However, UE 115a can figure out from the starting location of the PDCCH within the transmission slot which CBGs may have been punctured.

On the UE side, UE 115a will stitch together the data received during the first transmission, DL slot 0, and the retransmission of the punctured CBGs in DL slot 3 to recover the whole TB. For uplink transmissions from UE 115a, as UE 115a detects the LBT pass at 1905, any punctured CBGs from the transmission packet sent at slot boundary 1906 in UL mini-slot 0 (partial), may not autonomously be scheduled for retransmission by UE 115a. Instead, selected aspects provide for base station 105a to reschedule the punctured uplink CBGs for retransmission by UE 115a.

It should be noted that additional and alternative aspects of the present disclosure may provide for UE 115a to autonomously reschedule retransmission of the punctured CBGs from UL mini-slot 0. Both features associated with the scheduling of retransmission of the punctured uplink CBGs is within the scope of this disclosure.

Figure 20:
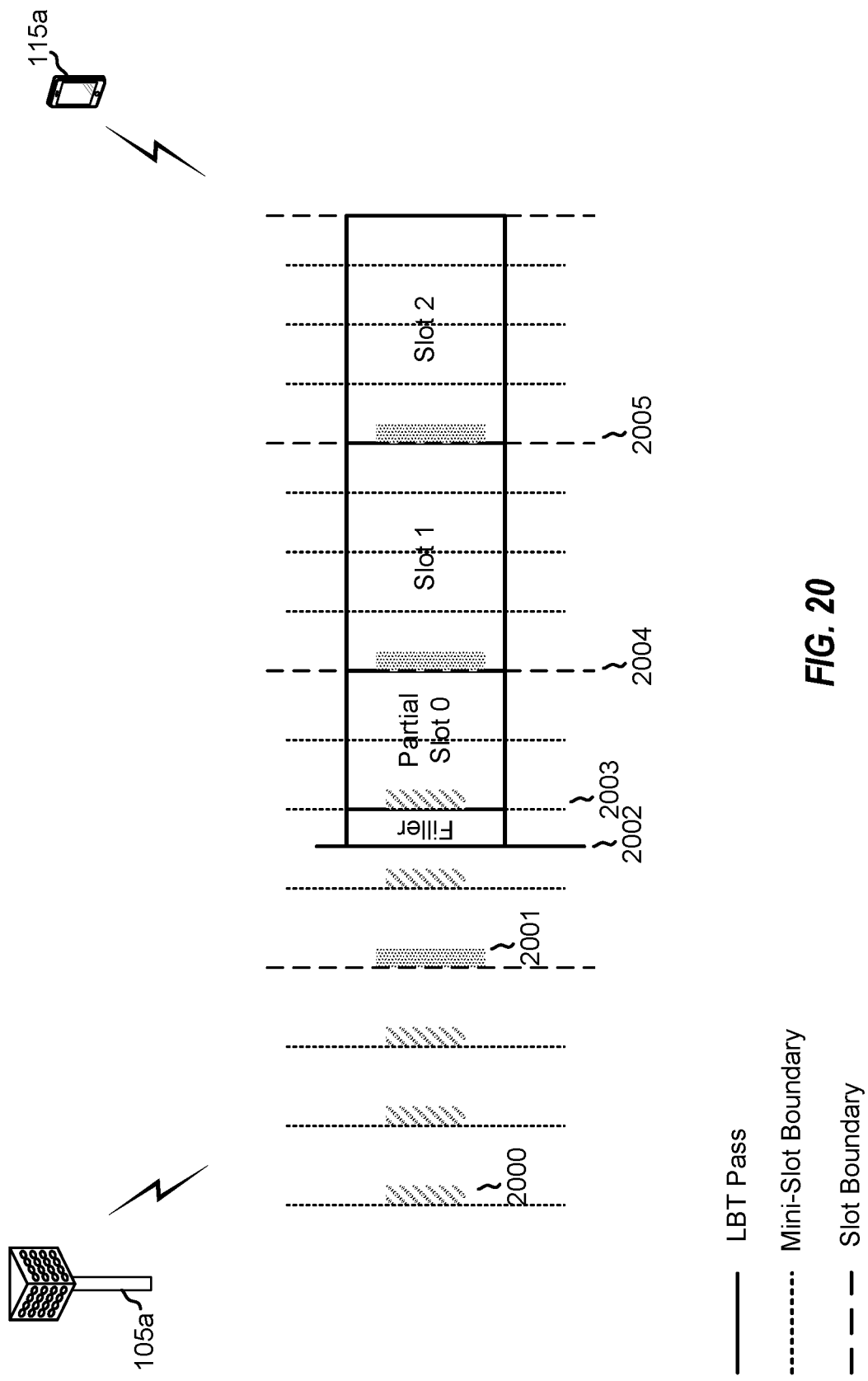
FIG. 20 is a block diagram illustrating a base station and a UE configured according to one aspect of the present disclosure.

FIG. 20 is a block diagram illustrating a base station 105a and a UE 115a configured according to one aspect of the present disclosure. Within the punctured slot based design for transmission starts, the potential transmission starts may begin at mini-slot intervals. While in an idle state, UE 115a may monitor for mini-slot coreset transmissions 2000 from base station 105a every mini-slot boundary, and slot coreset transmissions 2001 at each slot boundary. As in the mini-slot design based aspects, once UE 115a detects the success of the LBT procedure at 2002, UE 115a may reduce the monitoring frequency to each transmission slot boundary, such as mini-slot transmission boundary 2003, and slot transmission boundaries 2004 and 2005.

Figure 21:
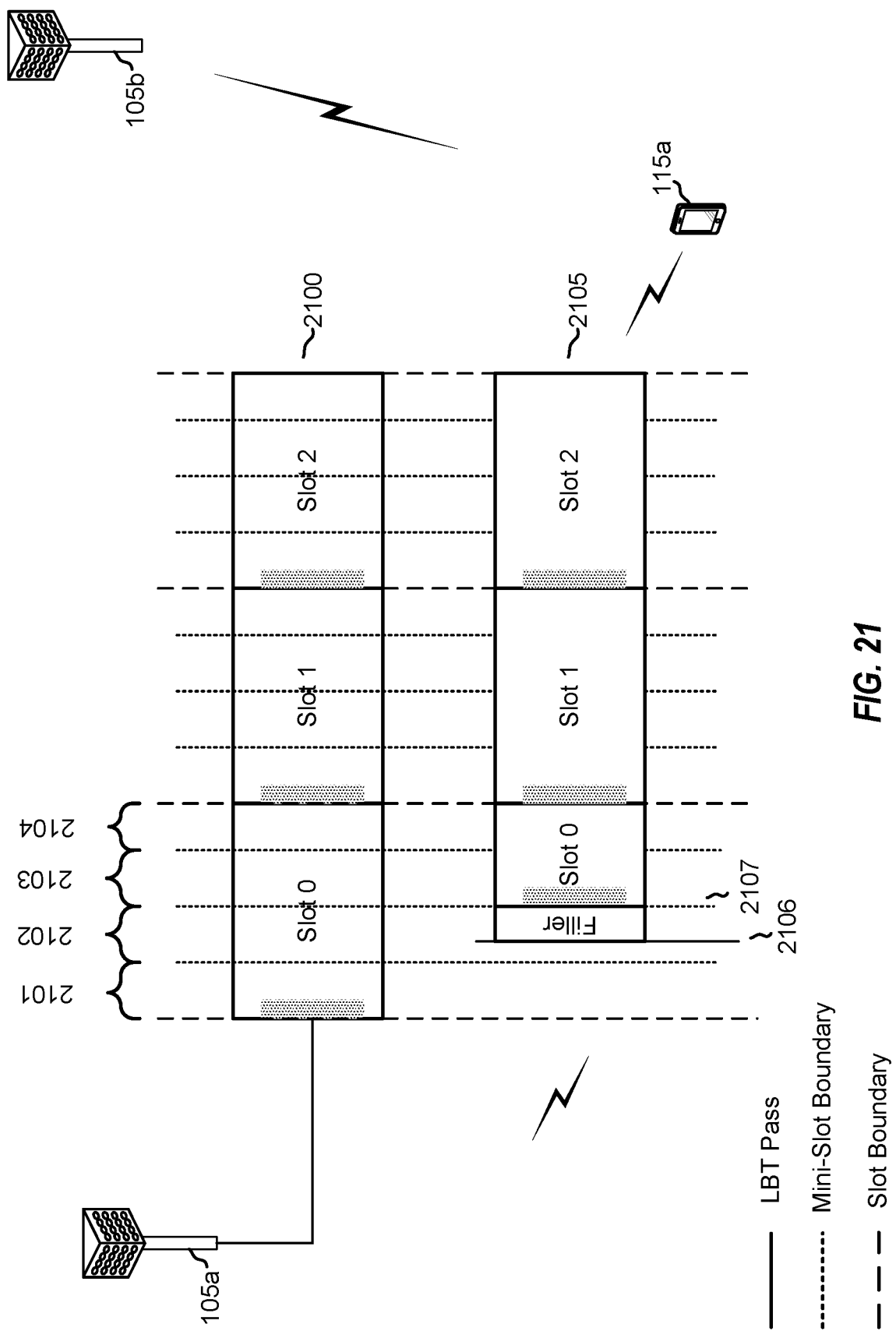
FIG. 21 is a block diagram illustrating a base station and UE configured according to aspects of the present disclosure.

FIG. 21 is a block diagram illustrating base station 105a and UE 115a configured according to aspects of the present disclosure. Rate matching may be performed ahead of time for the slot and puncturing the resources. Some symbols not available due to late LBT pass would not include any coreset transmission, which carry the PDCCH, which would be delayed to the transmitted portion of the slot. In one example implementation of FIG. 21, base station 105a pre-prepares the transmission packet for pre-preparation slot 0 in pre-preparation stream 2100. The transmission packet for pre-preparation slot 0 includes mini-slots 2101-2104. As the LBT procedure is delayed into pre-preparation slot 0, base station 105a determine which data to puncture. In the presently described example, after detection of the LBT pass at 2106, base station 105a will determine to puncture the earlier CBGs of mini-slots 2101 and 2102. Depending when 2106 occurs in mini-slot 2102, the puncturing may not always be along CBG boundaries, which may result in some inefficiency in retransmissions of an entire CBG when some parts of the code block remain and are transmitted. The surviving CBGs of partial slot 0 of transmission stream 2105 would maintain the same modulation and coding scheme (MCS)/coding rate, as originally scheduled. The coreset that would have been transmitted in either mini-slot 2101 or 2102, may then be shifted up to mini-slot 2103 for transmission in partial slot 0 of transmission stream 2105.

It should be noted that if the remaining part of slot 0 of transmission stream 2105 after puncturing has no DMRS, the partial slot 0 could not be decoded. Accordingly, in a first optional aspect, transmission slot configurations may only be considered that include DMRS configurations in the part of pre-preparation slot 0 of pre-preparation stream 2100. In the present example, configurations where DMRS is included in the later portions of pre-preparation slot 0 so that when the puncturing of pre-preparation slot 0 occurs, the remaining portions transmitted in partial slot 0 would include DMRS. In a second optional aspect, base station 105a may simply add DMRS to the remaining portion of CGBs included in partial slot 0. DMRS may then be punctured into the remaining part of partial slot 0 as well as rate matching around SSB and other reserved REs, if such exist in the remaining part of partial slot 0.

If base station 105a transmits a PDCCH (self-scheduling), UE 115a can use the detected PDCCH location to determine the starting point of the partial slot. Additional and alternative aspects of the present disclosure may also provide for a layer 1 (L1) channel that may be used for starting point detection. In carrier aggregation scenarios which use cross carrier scheduling (e.g., scheduling from a licensed anchor carrier), there would be no PDCCH transmitted from base station 105a on the unlicensed shared communication carrier. In such systems, a pre-emption indicator (PI) mechanism may be used to indicate to UE 115a what was punctured. The PI would be transmitted after the LBT outcome is known, and, thus, the starting point would also be known. The PI can be transmitted in the licensed anchor carrier of the carrier aggregation from base station 105b or the unlicensed shared carrier from base station 105a.

Where fast rate matching is possible, base station 105a may first estimate which CBGs of mini-slots 2101-2104 can be retransmitted in the remaining part of the transmission opportunity. A common rule for how to determine which CBGs to retransmit may be used. In such case, there would be no need to indicate which CBGs are transmitted in the first slot and no need to change the PDCCH. The set of CBGs carried will be implicitly implied by the PDCCH starting location. Base station 105a may then rate match these CBGs into the available REs, while the remaining CBGs will be covered in later retransmissions. In order to maintain the likelihood of success in decoding by UE 115a, base station 105a may float the DMRS so that it would be included in the transmission of partial slot 0 of transmission stream 2105.

An additional and alternative aspect of the present disclosure may provide for beginning the transmission, after detection of the LBT pass at 2106, of partial slot 0 using the CBGs at the beginning of pre-preparation slot 0 (e.g., mini-slots 2101 and 2102). Base station 105a may puncture the remaining CBGs of the later part of pre-preparation slot 0 (e.g., mini-slots 2103 and 2104). When the early CBGs of pre-preparation slot 0 are used, the DMRS remains in the transmitted portion of partial slot 0, and base station 105a would not perform re-rate matching. Any potential collision with scheduled SSB may be handled using puncturing as described previously.

On the uplink side, similar procedures may be performed by UE 115a for preparing and sending PUSCH. However, CBG-level retransmission would be scheduled by base station 105a. Moreover, UE 115a may use DMRS at the beginning of PUSCH to provide for detection of the uplink burst starting point.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4, 6, 8, 10, 16, 18A, and 18B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   monitoring, by a user equipment (UE), for a control resource set (CORESET) in each of a plurality of mini-slots configured within each system slot of a shared communication channel;
   detecting, by the UE, a beginning of a transmission opportunity of the shared communication channel by a serving base station; and
   in response to detection of the beginning of the transmission opportunity and commencing in a next system slot after a current system slot in which the beginning was detected:
      ceasing, by the UE, the monitoring for the CORESET in the each of the plurality of mini-slots for a remainder of the transmission opportunity, and
      monitoring, by the UE, for the CORESET in the each system slot for the remainder of the transmission opportunity.

2. The method of claim 1, further including:
   receiving, by the UE, an uplink grant from the serving base station, wherein the uplink grant includes allocation of a sequence of transmission units for an uplink burst;
   performing, by the UE, a listen before talk (LBT) procedure on a shared communication channel;
   preparing, by the UE, one or more uplink transmission packets using control information included in the uplink grant;
   dropping, by the UE, an uplink transmission packet for each transmission unit of the sequence of transmission units prior to detection of success of the LBT procedure; and
   transmitting, by the UE, remaining uplink transmission packets of the one or more uplink transmission packets in remaining transmission units of the sequence in response to the detection of the success.

3. The method of claim 2, wherein the sequence of transmission units includes one or more of:
   a plurality of mini-slots of a system slot; and
   one or more system slots.

4. An apparatus configured for wireless communication, the apparatus comprising:
   at least one processor; and
   a memory coupled to the at least one processor,
   wherein the at least one processor is configured to:
      monitor, by a user equipment (UE), for a control resource set (CORESET) in each of a plurality of mini-slots configured within each system slot of a shared communication channel;
      detect, by the UE, a beginning of a transmission opportunity of the shared communication channel by a serving base station; and
      in response to detection of the beginning of the transmission opportunity and commencing in a next system slot after a current system slot in which the beginning was detected:
         cease, by the UE, the configuration of the at least one processor to monitor for the CORESET in the each of the plurality of mini-slots within the each system slot for a remainder of the transmission opportunity, and monitor, by the UE, for the CORESET in the each system slot for the remainder of the transmission opportunity.

5. The apparatus of claim 4, further including configuration of the at least one processor to:
receive, by the UE, an uplink grant from the serving base station, wherein the uplink grant includes allocation of a sequence of transmission units for an uplink burst;
perform, by the UE, a listen before talk (LBT) procedure on a shared communication channel;
prepare, by the UE, one or more uplink transmission packets using control information included in the uplink grant;
drop, by the UE, an uplink transmission packet for each transmission unit of the sequence of transmission units prior to detection of success of the LBT procedure; and
transmit, by the UE, remaining uplink transmission packets of the one or more uplink transmission packets in remaining transmission units of the sequence in response to the detection of the success.

6. The apparatus of claim 5, wherein the sequence of transmission units includes one or more of:
a plurality of mini-slots of a system slot; and
one or more system slots.

* * * * *